US009559874B2

(12) United States Patent
Han et al.

(10) Patent No.: US 9,559,874 B2
(45) Date of Patent: *Jan. 31, 2017

(54) MULTIUSER TIME-REVERSAL DIVISION MULTIPLE ACCESS UPLINK SYSTEM WITH PARALLEL INTERFERENCE CANCELLATION

(71) Applicant: Origin Wireless Communications, Inc., College Park, MD (US)

(72) Inventors: Feng Han, Baltimore, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,320

(22) Filed: Aug. 16, 2013

(65) Prior Publication Data

US 2015/0049792 A1 Feb. 19, 2015

(51) Int. Cl.
*H04L 25/03* (2006.01)
*H04W 24/08* (2009.01)
(Continued)

(52) U.S. Cl.
CPC ....... *H04L 25/03012* (2013.01); *H04B 17/309* (2015.01); *H04L 25/0328* (2013.01);
(Continued)

(58) Field of Classification Search
CPC .................... H04L 2025/03802; H04L 1/0026; H04L 25/03012; H04L 25/0328; H04B 15/00; H04B 1/71072; H04B 1/71075; H04B 1/7107; H04B 17/309; H04J 11/004
(Continued)

(56) References Cited

U.S. PATENT DOCUMENTS 2,933,702 A 4/1960 Bogert
3,767,855 A 10/1973 Ueno et al.
(Continued)

FOREIGN PATENT DOCUMENTS

EP 2 571 214 A1 3/2012
WO WO 2007/031088 3/2007
(Continued)

OTHER PUBLICATIONS

D. Divsalar and M. K. Simon, "Improved CDMA performance using parallel interference cancellation", JPL Publication, 95-21, Oct. 1995.
(Continued)

*Primary Examiner* — Kevin M Burd
(74) *Attorney, Agent, or Firm* — Fish & Richardson P.C.

(57) ABSTRACT

In a time-reversal wireless system, a transceiver receives a combined signal that includes signals from a plurality of devices, each device sending a signal to the transceiver through multiple wireless propagation paths. Signals sent from each of the devices are estimated based on the combined signal and a signature waveform associated with the device. Interference associated with the estimated signal from each of the devices is determined based on the estimated signals from the devices. The signal sent from each of the devices is determined by subtracting the interference associated with the estimated signal associated with the device from the estimated signal associated with the device.

53 Claims, 17 Drawing Sheets

(51) Int. Cl.
H04B 17/309 (2015.01)
H04L 12/26 (2006.01)
(52) U.S. Cl.
CPC .. *H04L 25/03318* (2013.01); *H04L 25/03343* (2013.01); *H04L 43/12* (2013.01); *H04W 24/08* (2013.01); *H04L 2025/03802* (2013.01)
(58) Field of Classification Search
USPC ................................ 375/316, 346, 349, 219
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,137,788 | A * | 10/2000 | Sawahashi et al. .......... 370/342 |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2007/0071077 | A1* | 3/2007 | Yang ............................ 375/218 |
| 2009/0296786 | A1* | 12/2009 | Massicotte et al. .......... 375/148 |
| 2010/0240312 | A1* | 9/2010 | Peng et al. .................... 455/63.1 |
| 2010/0302977 | A1 | 12/2010 | Huy et al. |
| 2010/0309829 | A1 | 12/2010 | Huy et al. |
| 2010/0316163 | A1* | 12/2010 | Forenza et al. ............... 375/296 |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0201958 | A1* | 8/2013 | Phan Huy et al. .......... 370/329 |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1 | 7/2014 | Han et al. |
| 2015/0049745 | A1 | 2/2015 | Han et al. |
| 2015/0049792 | A1 | 2/2015 | Han et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012052692 A1 * | 4/2012 |
| WO | WO 2012/151316 | 11/2012 |
| WO | WO 2013/126054 | 8/2013 |

OTHER PUBLICATIONS

D. Divsalar, M. K. Simon, Dan Raphaeli, "Improved Parallel Interference Cancellation for CDMA", IEEE Transactions on Communications, vol. 46, No. 2, Feb. 1998.
A. Duel-Hallen, J. Holtzman, and Z. Zvonar, "Multiuser detection for CDMA systems", IEEE Personal Communications, pp. 46-58, Apr. 1995.
M. Fink, C. Prada, F. Wu, and D. Cassereau, "Self focusing in inhomogeneous media with time reversal acoustic mirrors," IEEE Ultrasonics Symposium, vol. 1, pp. 681-686, 1989.
F. Han, Y. Yang, B. Wang, Y. Wu and K. J. R. Liu, "Time-Reversal Division Multiple Access over Multi-path Channels", IEEE Trans. on Communications, vol. 60, No. 7, pp. 1953-1965, Jul. 2012.
M. Lienard, P. Degauque, V. Degardin, I. Yin, "Focusing Gain Model of Time-Reversed Signals in Dense Multipath Channels," IEEE Antennas and Wireless Propagation Letters, vol. 11, pp. 1064-1067, 2012.
A. F. Molisch et al., "IEEE 802.15.4a channel model-final report", Tech. Rep. Document IEEE 802.15-04-0662-02-004a, 2005.
S. Moshavi, "Multi-user detection for DS-CDMA communications", IEEE Communications Magazine, pp. 124-136, Oct. 1996.
C. Prada, F. Wu, and M. Fink, "The iterative time reversal mirror: A solution to self-focusing in the pulse echo mode," J. Acoustic Society of America, vol. 90, pp. 1119-1129, 1991.
D. Tse and P. Viswanath, Fundamental of Wireless Communication, Cambridge University Press, New York, 2005.
M. K. Varanasi and B. Aazhang, "Multistage Detection in Asynchronous Code-Division Multiple-Access Communications", IEEE Transactions on Communications, vol. 38, No. 4, pp. 509-519, Apr. 1990.
S. Verdu, "Minimum probability of error for asynchronous Gaussian multiple-access channels", IEEE Trans. Inform. Theory, vol. IT-32, pp. 85-96, Jan. 1986.
S. Verdu, "Optimum multiuser asymptotic efficiency", IEEE Trans. Commun., vol. COM-34, pp. 890-897, Sep. 1986.
A. J. Viterbi, "Very low rate convolutional codes for maximum theoretical performance of spread-spectrum multiple-access channels", IEEE Transactions on Selected Areas in Communications, vol. 8, No. 4, pp. 641-649, May 1990.
B. Wang, Y. Wu, F. Han, Y. H. Yang, and K. J. R. Liu, "Green wireless communications: a time-reversal paradigm," IEEE Journal on Selected Areas in Communications, vol. 29, No. 8, pp. 1698-1710, Sep. 2011.
Y. Yang, B. Wang, W. Lin, K. J. R. Liu, "Near-Optimal Waveform Design for Sum Rate Optimization in Time-Reversal Multiuser Downlink Systems", IEEE Trans. on Wireless Communications, vol. 12, No. 1, pp. 346-357, Jan. 2013.
D. Abbasi-Moghadam and V.T. Vakili, "A SIMO one-bit time reversal for UWB communication systems", EURASIP J. Wireless Comm. and Networking, 2012:113, 2012.
D. Albert, L. Liu, M. L. Moran, "Time Reversal processing for source location in an urban environment (L)", J. Acoust. Soc. Am., vol. 118, No. 2, pp. 616-619, Aug. 2005.
A.P. Brysev, L.M. Krutyanskii, V'L. Preobrazhenskii, "Wave Phase Conjugation in ultrasonic beams", Physics-Uspekhi, vol. 41, No. 8, pp. 793-805, 1998.
Y.H. Chang, S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.
Y. Chen, F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.
Chen, Y. et al., "Time-reversal wideband communications," IEEE Signal Processing Letters, vol. 20(12):1219-1222 (Dec. 2013).
R. C. Daniels and R. W. Heath, "Improving on time-reversal with MISO precoding," in the Proceedings IWC/WPMC, Aalborg, Denmark, Sep. 2005.
R. C. Daniels and R. W. Heath, "MISO precoding for temporal and spatial focusing" in the Proceedings of the Eighth International Symposium on Wireless Personal Communications Conference, Aalborg, Denmark, 2005
G.F. Edelmann, T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.

(56) References Cited

OTHER PUBLICATIONS

Emami et al., "Matched Filtering with Rate Back-off for Low Complexity Communications in Very Large Delay Spread Channels," 38th Asilomar Conference on Signals, Systems and Computers, pp. 218-222, 2004.

S.M. Emami, J. Hansen, A.D. Kim, G. Papanicolaou, A.J. Paulraj, D. Cheung, C. Prettie, "Predicted Time Reversal Performance in Wireless Communications using Channel Measurements", publication details unknown.

R.J. Fontana, S.J. Gunderson, "Ultra-Wideband Precision Asset Location System", Proc. of the IEEE Conf. on UWB Sys. and Tech., pp. 147-150, 2002.

F. Han, "Energy Efficient Optimization in Green Wireless Networks", University of Maryland Ph. D. Dissertation, 2013.

G. Lerosey, J. de Rosny, A. Tourin, A. Derode, M. Fink, "Time Reversal of Wideband Microwaves", Appl. Phys. Lett., vol. 88, 154101, Apr. 2006.

A.Derode, A. Tourin, and M. Fink, "Ultrasonic pulse compression with one-bit time reversal through multiple scattering", J. Appl. Phys., vol. 85, No. 9, pp. 6343-6352, May 1999.

M. Fink and C. Prada, "Acoustic Time-Reversal Mirrors", Inverse Problems, vol. 17, pp. R1-R38, 2001.

C. Dorme and M. Fink, "Focusing in transmit-receive mode through inhomogeneous media: The time reversal matched filter approach", J. Acoust. Soc. Am., vol. 98, Pt. 1, pp. 1155-1162, Aug. 1995.

I.H. Naqvi, G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.

A. Derode, P. Roux, and M. Fink, "Robust Acoustic Time Reversal and High-Order Multiple Scattering", Phys. Rev. Left., vol. 75, No. 23, pp. 4206-4210, Dec. 1995.

A.Derode, A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

G. Lerosey, J. de Rosny, A. Tourin, A. Derode, G. Montaldo and M. Fink, "Time Reversal of Electromagnetic Waves", Phys. Rev. Lett., vol. 92, No. 19, 193904, May 2004.

F. Lemoult, G. Lerosey, J. de Rosny, and M. Fink, "Manipulating Spatiotemporal Degrees of Freedom in Waves of Random Media", Phys. Rev. Lett., vol. 103, 173902, Oct. 2009.

F. Lemoult, G. Lerosey, J. de Rosny, and M. Fink, "Resonant Metalenses for Breaking the Diffraction Barrier", Phys. Rev. Left., vol. 104, 203901, May 2010.

G. Lerosey, J. de Rosny, A. Tourin, A. Derode, G. Montaldo and M. Fink, "Time Reversal of Electromagnetic Waves and Telecommunication", Radio Science, vol. 40, RS6S12, 2005.

G. Lerosey, J. de Rosny, A. Tourin, and M. Fink, "Focusing beyond the diffraction limit with far-field time reversal", Science, vol. 315, pp. 1120-1122, Feb. 2007.

J. de Rosny, G. Lerosey and M. Fink, "Theory of Electromagnetic Time-Reversal Mirrors", IEEE Trans. Antennas Propag., vol. 58, No. 10, pp. 3139-3149, Oct. 2010.

M. Fink, "Time Reversal of Ultrasonic Fields-Part I: Basic Principals", IEEE Trans. Ultrasonics, Ferroelectrics and Freq. Contr., vol. 39, No. 5, pp. 555-566, Sep. 1992.

F. Wu, J.L. Thomas, and M. Fink, "Time Reversal of Ultrasonic Fields-Part II: Experimental Results", IEEE Trans. Ultrasonics, Ferroelectrics and Freq. Contr., vol. 39, No. 5, pp. 567-578, Sep. 1992.

G. Montaldo, G. Lerosey, A. Derode, A. Tourin, J. de Rosny, and M. Fink, "Telecommunication in a disordered environment with iterative time reversal," Waves Random Media, vol. 14, pp. 287-302, May 2004.

M. Fink, "Time-Reversal Mirrors", J. Phys. D: Appl. Phys., vol. 26, pp. 1333-1350, 1993.

M. Fink, "Time-Reversed Acoustics", Scientific American, pp. 91-97, Nov., 1999.

F. Han, Y.H. Yang, B. Wang, Y. Wu, K.J.R. Liu, "Time-reversal division multiple access in multi-path channels," Global Telecommunications Conference, pp. 1-5 (2011).

F. Han and K.J.R. Liu, "An Interference Cancellation Scheme for the Multiuser TRDMA Uplink System," Global Telecommunications Conference, pp. 3583-3588 (2013).

F. Han and K.J.R. Liu, "A multiuser TRDMA uplink system with 2D parallel interference cancellation," IEEE Transactions on Communications, vol. 62(3):1011-1022 (Mar. 2014).

B.E. Henty and D.D. Stancil, "Multipath-Enabled Super-Resolution for rf and Microwave Communication using Phase-Conjugate Arrays", Phys. Rev. Lett., vol. 93, 243904, Dec. 2004.

A.Khalegi, G. El Zein and I. Navqi, "Demonstration of Time-Reversal in Indoor Ultra-Wideband Communication: Time Domain Measurement", IEEE Proc. of ISWCS, pp. 465-468, 2007.

W.A. Kuperman, W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.

Kyritsi, P. et al., "Time reversal and zero-forcing equalization for fixed wireless access channels," 39th Asilomar Conference on Signals, Systems and Computers, pp. 1297-1301 (2005).

Kyritsi, P. et al., "Time reversal techniques for wireless communications," IEEE Vehicular Technology Conference, vol. 1:47-51 (2004).

P. Kyritsi and G. Papanicolau, "One-bit Time Reversal for WLAN Applications", IEEE 16$^{th}$ Intern. Symp. on Personal, Indoor and Mobile Radio Comm., pp. 532-536, 2005.

H. Ma, F. Han, and K.J.R. Liu, "Interference-Mitigating Broadband Secondary User Downlink System: A Time-Reversal Solution", Global Telecommunications Conference, pp. 884-889, (2013).

Jin, Yuanwei et al., "Adaptive time reversal beamforming in dense multipath communication networks," 2008 42nd Asilomar Conference on Signals, Systems and Computers, pp. 2027-2031 (Oct. 2008).

J.M.F. Moura and Y. Jin, "Detection by Time Reversal: Single Antenna", IEEE Trans. On Signal Process., vol. 55, No. 1, Jan. 2007.

J.M.F. Moura and Y. Jin, "Time Reversal Imaging by Adaptive Interference Canceling", IEEE Trans. On Signal Process., vol. 56, No. 1, Jan. 2008.

J.Y. Jin and .M.F. Moura, "Time Reversal Detection Using Antenna Arrays", IEEE Trans. On Signal Process., vol. 57, No. 4, Apr. 2009.

I.H. Naqvi, P. Besnier and G. El Zein, "Effects of Time Variant Channel on a Time Reversal UWB System", Global Telecommunications Conference, (2009).

I.H. Naqvi, A. Khaleghi and G. El Zein, "Performance Enhancement of Multiuser Time Reversal UWB Communication System", Proc. of IEEE ISWCS, pp. 567-571, 2007.

H.T. Nguyen, "Partial one bit time reversal for UWB impulse radio multi-user communications", IEEE Proc. of ICCE, 2008.

T.K. Nguyen, H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

H. Nguyen, Z. Zhao, F. Zheng and T. Kaiser, "On the MSI Mitigation for MIMO UWB Time Reversal Systems", Proc. of IEEE International Conference on Ultra-Wideband, pp. 295-299, 2009.

T.K. Nguyen, H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.

Nguyen, H. T. et al., "A time reversal transmission approach for multiuser UWB communications," IEEE Transactions on Antennas and Propagation, vol. 54: 3216-3224 (Nov. 2006).

H. Nguyen, Z. Zhao, F. Zheng, and T. Kaiser, "Preequalizer Design for Spatial Multiplexing SIMO-UWB TR Systems", IEEE Trans. On Vehicular Tech., vol. 59, No. 8, Oct. 2010.

H. Nguyen, F. Zheng, and T. Kaiser, "Antenna Selection for Time Reversal MIMO UWB Systems", IEEE Vehicle Technology Conference, pp. 1-5, 2009.

(56) References Cited

OTHER PUBLICATIONS

H.T. Nguyen, "On the performance of one bit time reversal for multi-user wireless communications", IEEE Proc. of ISWCS, pp. 672-676, 2007.
C. Oestges, A.D. Kim, G Papanicolaou, and A.J. Paulraj, "Characterization of Space-Time Focusing in Time Reversed Random Fields", IEEE Trans. Antennas and Propag., pp. 1-9, 2005.
A.Parvulescu and C.S. Clay, "Reproducibility of Signal Transmissions in the Ocean", The Radio and Electronic Engineer, pp. 223-228, Apr. 1965.
D.T. Phan-Huy, S.B. Halima, M. Helard, "Frequency Division Duplex Time Reversal", Global Telecommunications Conference, (2011).
D. Porcino, "Ultra-Wideband Radio Technology: Potential and Challenges Ahead", IEEE Communications Mag., pp. 66-74, Jul. 2003.
Qiu, R. C. et al., "Time reversal with miso for ultra-wideband communications: Experimental results," IEEE Antenna and Wireless Propagation Letters, vol. 5:269-273 (2006).
N. Guo, B.M. Sadler and R.C. Qiu, "Reduced-Complexity UWB Time-Reversal Techniques and Experimental Results", IEEE Trans. On Wireless Comm., vol. 6, No. 12, Dec. 2007.
D. Rouseff, D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
H. Saghir, M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
H.C. Song, W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
H.C. Song, W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
T. Strohmer, M. Emami, J. Hansen, G. Papanicolaou and A.J. Paulraj, "Application of Time-Reversal with MMSE Equalizer to UWB Communications", Global Telecommunications Conference, pp. 3123-3127, (2004).
S.Q. Xiao, J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Y.H. Yang, B. Wang and K.J.R. Liu, "Waveform Design for Sum Rate Optimization in Time-Reversal Multiuser Downlink Systems", Global Telecommunications Conference, (2011).
X. Zhou, P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
J.P. Rode, M.J. Hsu, D. Smith and A. Hussain, "Collaborative Beamfocusing Radio (COBRA)", Proc. of SPIE, vol. 8753, pp. 87530J-1-11, 2013.
Y.H. Yang, "Waveform Design and Network Selection in Wideband Small Cell Networks", University of Maryland Ph. D. Thesis, 2013.
Yang, Yu-Han et al., "Waveform Design for Time-Reversal Systems", U.S. Appl. No. 13/706,342, filed Dec. 5, 2012, 86 pages.
Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.
Jin, Y., Moura, J., "Time-Reversal Detection Using Antenna Arrays", IEEE Trans. Signal Processing, vol. 57(4):1396-1414, Apr. 2009.
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
USPTO Non-Final Office Action, Examiner Debebe A. Asefa, U.S. Appl. No. 13/969,271, issued on Aug. 2, 2016, 36 pages.
USPTO Final Office Action, Examiner Debebe A. Asefa, U.S. Appl. No. 13/969,271, issued on Dec. 21, 2015, 27 pages.
USPTO Non-Final Office Action, Examiner Debebe A. Asefa, U.S. Appl. No. 13/969,271, issued on May 29, 2015, 29 pages.

* cited by examiner

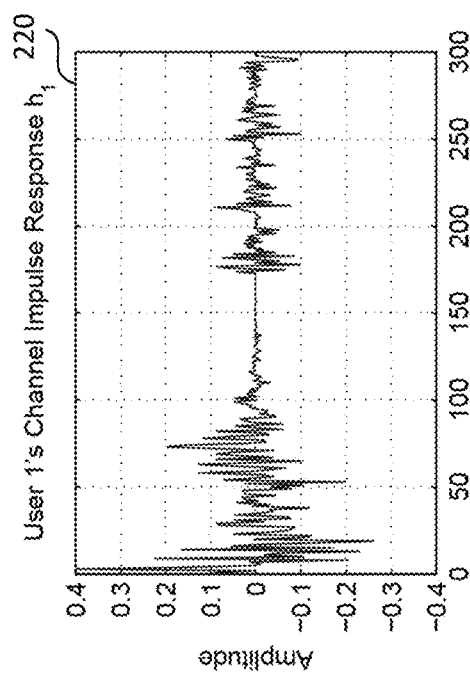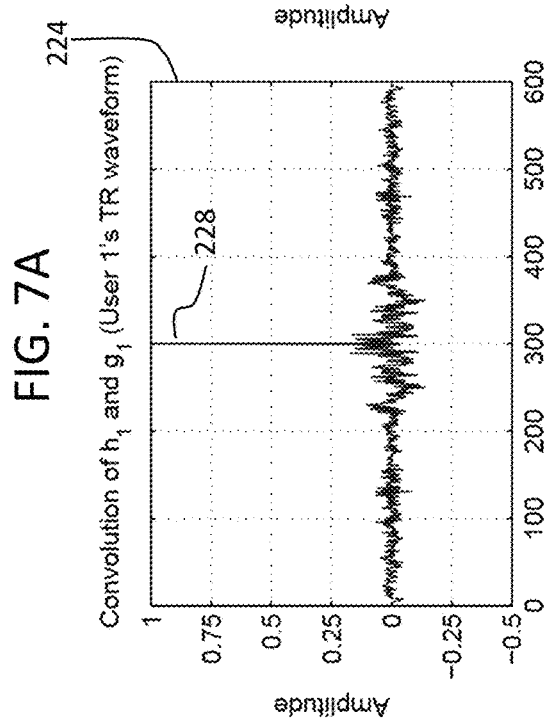

MULTIUSER TIME-REVERSAL DIVISION MULTIPLE ACCESS UPLINK SYSTEM WITH PARALLEL INTERFERENCE CANCELLATION

TECHNICAL FIELD

This disclosure generally relates to time-reversal wireless systems having interference cancellation.

BACKGROUND

A time-reversal division multiple access (TRDMA) system provides a cost-effective single-carrier technology for broadband communications and at the same time leverages the degrees of freedom in a large number of multi-paths to form a unique high-resolution spatial focusing effect. In some time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

In general, in one aspect, a method for time-reversal wireless communication with interference cancellation is provided. The method includes at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths, each of the first and second signals includes a plurality of symbols; generating a first set of estimated symbols based on the combined signal and a first signature waveform associated with the first device, the first set of estimated symbols representing a rough estimate of the symbols sent from the first device; generating a second set of estimated symbols based on the combined signal and a second signature waveform associated with the second device, the second set of estimated symbols representing a rough estimate of the symbols sent from the second device; determining interference based on at least one of the first set of estimated symbols or the second set of estimated symbols; and generating a refined first set of estimated symbols by canceling the interference from the first set of estimated symbols, the refined first set of estimated symbols representing a refined estimate of the symbols sent from the first device.

Implementations of the method may include one or more of the following features. The interference can include inter-user interference, and determining interference can include determining inter-user interference based on the second set of estimated symbols.

Generating a refined first set of estimated symbols can include canceling the inter-user interference due to the second device from the first set of estimated symbols.

The interference can also include inter-symbol interference, and determining interference can include determining inter-symbol interference based on the first set of estimated symbols.

Generating a refined first set of estimated symbols can include canceling the inter-user interference and the inter-symbol interference from the first set of estimated symbols.

The interference can include inter-symbol interference, and determining interference can include determining inter-symbol interference based on the first set of estimated symbols.

Generating a refined first set of estimated symbols can include canceling the inter-symbol interference from the first set of estimated symbols.

Determining interference and generating a refined first set of estimated symbols can be part of a first stage interference cancelation operation, and the method can further include performing a second stage interference cancelation operation that includes: determining refined interference values based on the first set of estimated symbols, the second set of estimated symbols, and the symbols sent by the first device as determined by the first stage interference cancelation operation, and generating a further refined first set of estimated symbols by canceling the refined interference values from the first set of estimated symbols, the further refined first set of estimated symbols representing a further refined estimate of the symbols sent from the first device.

The method can include performing a hand-shaking process between the transceiver and the first device to identify multipath channel characteristics associated with the first device, and calculating the first signature waveform for the first device based on the multipath channel characteristics associated with the first device.

Generating a first set of estimated symbols can include performing a convolution operation, or an operation equivalent to the convolution operation, between the combined signal and the first signature waveform.

The method can include transmitting, from the transceiver to the first device and the second device, a combined downlink signal derived from a combination of a first downlink waveform and a second downlink waveform, the first downlink waveform including data intended for the first device, the second downlink waveform including data intended for the second device.

The method can include generating the first downlink waveform based on the data intended for the first device and the signature waveform for the first device.

Generating the first downlink waveform can include performing a convolution of the data intended for the first device and the signature waveform for the first device.

The combined downlink signal can be configured to enable each of the first device and the second device to receive multipath signals that can be used determine a data signal intended for the device, the first and second devices receiving the downlink signal through different propagation paths and determining different data signals.

The transceiver can be part of a base station.

Receiving the combined signal can include receiving a combined signal that include signals from three or more devices communicating with the transceiver, each of the devices being associated with a corresponding signature waveform.

Determining interference can include, for each of the devices, determining inter-user interference due to each of the other devices, and the method can include canceling the inter-user interferences due to the other devices from the estimated symbols for the each of the device.

In general, in another aspect, a method for time-reversal wireless communication with interference cancellation is provided. The method includes at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths; estimating the first signal sent from the first device to generate a first estimated signal based on the combined signal and a first signature waveform associated with the first device; estimating the second signal sent from the second device to generate a second estimated signal based on the combined signal and a second signature waveform associated with the second device; determining interference based on at least one of the first estimated signal or the second estimated signal; and determining the signal sent from the first device by subtracting the interference from the first estimated signals.

In general, in another aspect, a method for time-reversal wireless communication with interference cancellation is provided. The method includes at a transceiver, receiving a combined signal that includes signals from a plurality of devices, each device sending a signal to the transceiver through multiple wireless propagation paths; estimating signals sent from each of the devices based on the combined signal and a signature waveform associated with the device; determining an interference associated with the estimated signal from each of the devices based on the estimated signals from the devices; and determining the signal sent from each of the devices by subtracting the interference associated with the estimated signal associated with the device from the estimated signal associated with the device.

Implementations of the method may include one or more of the following features. The interference can includes inter-user interference, and determining interference associated with each of the devices can include determining inter-user interference associated with each of the devices based on the signals sent from the other devices.

Determining the signal sent from each of the devices can include subtracting the inter-user interferences due to the other devices from the estimated signal associated with the device.

The interference can also include inter-signal interference, and determining interference can include determining inter-signal interference associated with each of the devices based on the estimated signal associated with the device.

Determining signal sent from each of the devices can include subtracting the inter-user interference and the inter-signal interference associated with the device from the estimated signal associated with the device.

The interference can include inter-signal interference, and determining interference can include determining inter-signal interference for each of the devices based on the estimated signal associated with the device.

Determining the signal sent from each of the devices can include subtracting the inter-signal interference for the device from the estimated signal for the device.

In general, in another aspect, an apparatus for time-reversal wireless communication with interference cancellation is provided. The apparatus includes an input circuit configured to receive a combined signal that includes signals from a plurality of devices, each signal being sent from a corresponding device to the apparatus through multiple wireless propagation paths; a time-reversal mirror module configured to estimate signals sent from each of the devices based on the combined signal and a signature waveform associated with the device; an interference cancellation and decision module configured to determine an interference associated with the estimated signal from each of the devices based on the estimated signals from the devices, and determine the signal sent from each of the devices by subtracting the interference associated with the estimated signal associated with the device from the estimated signal associated with the device.

Implementations of the apparatus may include one or more of the following features. The apparatus can include a base station that includes the input circuit, the time-reversal mirror module, and the interference cancellation module.

The interference can include inter-user interference, and the interference cancellation and decision module can be configured to determine inter-user interference associated with the estimated signal from each of the devices based on the estimated signals of the other devices.

The interference cancellation and decision module can be configured to determine the signal sent from each of the devices by subtracting the inter-user interferences due to the other devices from the estimated signal for the device.

The interference can also include inter-symbol interference, and the interference cancellation and decision module can be configured to determine inter-symbol interference for each of the devices based on the estimated signal for the device.

The interference cancellation and decision module can be configured to determine the signal sent from each of the devices by subtracting the inter-user interference and the inter-symbol interference from the estimated signal associated with the device.

The interference can include inter-symbol interference, and the interference cancellation and decision module can be configured to determine inter-symbol interference associated with the estimated signal for each of the devices based on the estimated signal associated with the device.

The interference cancellation and decision module can be configured to determine the signal sent from each of the devices by subtracting the inter-symbol interference associated with the estimated signal for the device from the estimated signal for the device.

The apparatus can include a second interference cancellation and decision module configured to determine refined interference for each of the devices based on the signal sent from each of the devices as determined by the first interference cancellation and decision module and the estimated signal associated with each of the devices as determined by the time-reversal mirror module.

The second interference cancellation and decision module can be configured to determine refined signals for each of the devices by subtracting the refined interference for each of the devices from the estimated signal associated with the device as determined by the time-reversal mirror module.

The time-reversal mirror module can be configured to calculate the signature waveform for each of the devices based on characteristics of the multiple propagation paths associated with the device.

The time-reversal mirror module can be configured to estimate the signal sent from each of the devices by performing a convolution operation, or an operation equivalent to the convolution operation, between the combined signal and the signature waveform for the device.

The apparatus can include a downlink module configured to determine a combined downlink signal derived from a combination of downlink waveforms each including data intended for one of the devices.

The downlink module can be configured to determine each of the downlink waveforms based on the data intended for the corresponding device and the signature waveform for the corresponding device.

The downlink module can be configured to determine the downlink waveform for each of the devices by performing a convolution, or an operation equivalent to the convolution, of the data intended for the device and the signature waveform for the device.

The combined downlink signal can be configured to enable each of the devices to receive multipath signals that can be used determine a data signal intended for the device, different devices receiving the downlink signal through different propagation paths and determining different data signals.

The details of one or more implementations of multiuser time-reversal divisional multiple access uplink systems with parallel interference cancellation are set forth in the accompanying drawings and the description below. Other features, aspects, and advantages will become apparent from the description, the drawings, and the claims.

BRIEF DESCRIPTION OF THE DRAWINGS

FIGS. 7A and 7B are graphs showing examples of channel impulse responses.

FIGS. 8A and 8B are graphs showing examples of convolutions of channel impulse responses and time-reversal signature waveforms.

Like reference symbols in the various drawings indicate like elements.

DETAILED DESCRIPTION

Figure 1:
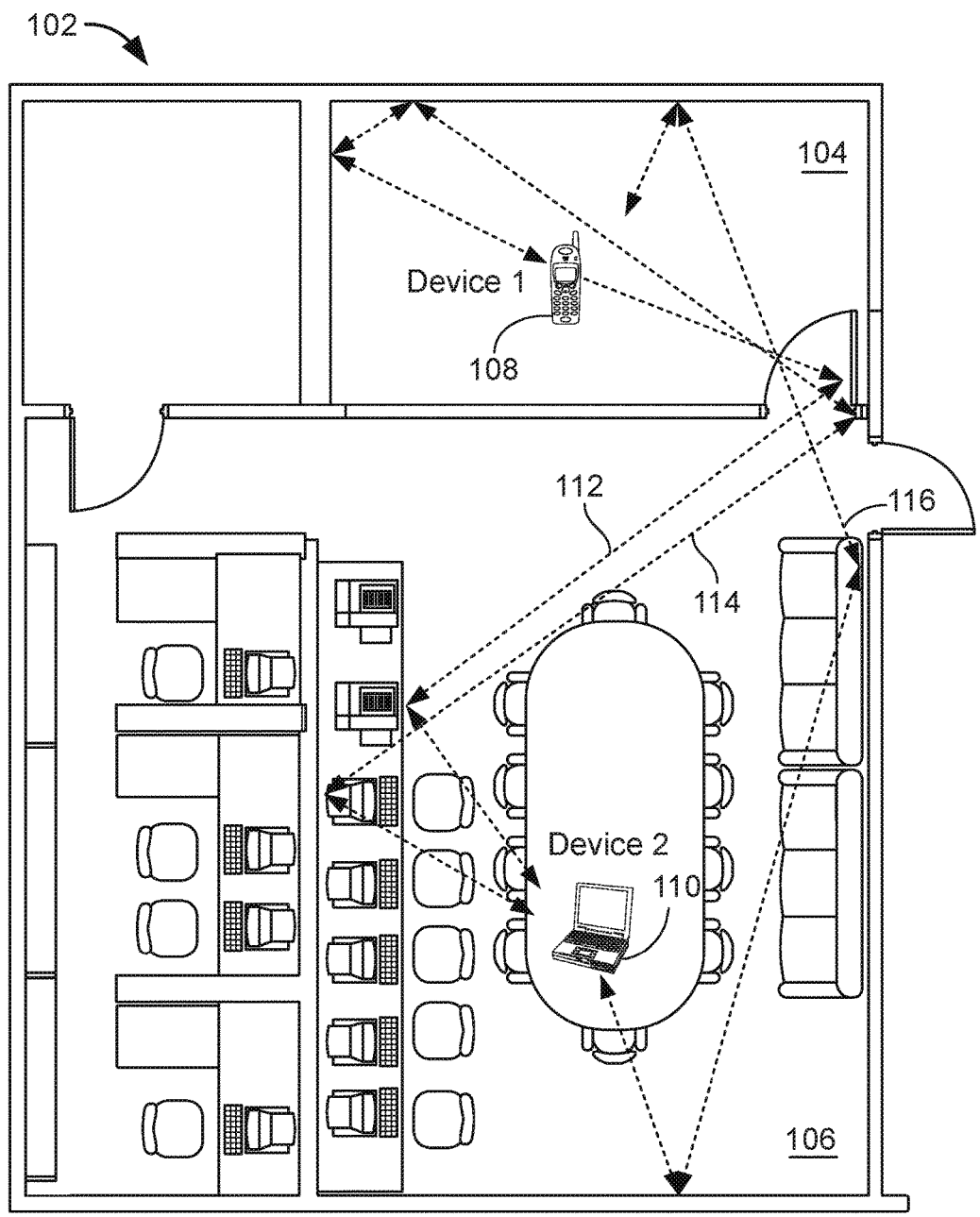
FIG. 1 is a diagram showing an exemplary environment for operating a time-reversal system.

This disclosure describes a novel time-reversal division multiple access based multi-user uplink architecture that uses a 2-dimensional (2D) parallel interference cancellation scheme to enhance the system performance. The time-reversal division multiple access uplink architecture reuses the processing power at a base station (BS) that has already been made available for the downlink, reducing the cost for the uplink modules at the terminal devices. The 2D parallel interference cancellation scheme uses the tentative decisions of detected symbols to effectively cancel the interference in both the time dimension (ISI) and the user dimension (inter-user interference (IUI), which significantly improves the bit-error-rate performance to achieve a high signal-to-noise-ratio (SNR). To further improve the BER performance, a multi-stage processing can be implemented by cascading multiple stages of the proposed 2D interference cancellation, with a total delay that increases linearly with the number of stages, but independent of the number of users. Simulation results are provided for up to 3 stages of interference cancellation and compared with the basic time-reversal division multiple access system without interference cancelation.

In this description, depending on context, the term "user" may refer to a device. For example, in a system that has multiple devices communicating with a base station, the term "multi-user uplink" refers to the uplink by multiple devices, and the term "inter-user interference" refers to the interference among various devices.

The time-reversal division multiple access technology has a wide variety of applications. For example, an intelligent house may include one or more computers that communicate wirelessly with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system).

For example, an intelligent factory may include one or more computers that communicate wirelessly with robots working in assembly lines, vehicles that move supplies and assembled products, climate control systems, security systems, inventory control systems, and power systems. For example, a laboratory may include one or more computers that communicate wirelessly with instruments that monitor parameters when conducting experiments.

In the examples above, the computer can communicate with the devices using time-reversal division multiple access technology that uses the environment to provide spatial filtering, allowing a large number of devices to communicate with the computers simultaneously. Compared to using previous wireless communication technologies, such as Wi-Fi or Bluetooth, time-reversal division multiple access has the advantage that the additional cost for enabling each device to communicate with the computer is small because the device itself does not need to perform complicated signal processing. Most of the signal processing is performed at the computer. The power consumption by each device for enabling wireless communication is also much smaller compared to previous wireless technologies.

Because the signals are transmitted through multiple propagation paths having various propagation lengths, there may be a large delay spread, and it may be possible for the computer to receive the tail end of the signal of an earlier symbol and the front end of a later symbol at the same time, resulting in inter-symbol interference. During an uplink cycle, multiple devices transmit signals to the computer at the same time, so the computer receives a combined signal having components from several devices. The time-reversal system uses signature waveforms associated with each device to identify the signal components for each device. After using the signature waveforms as a filtering mechanism to identify individual signal components, there may still be interference among signals from different devices. To increase the accuracy of communication, the computer may perform signal processing to cancel inter-symbol interference and/or inter-user interference.

Compared to previous multi-carrier techniques used to reduce inter-symbol interference, such as orthogonal frequency-division multiplexing (OFDM) or orthogonal frequency-division multiple access (OFDMA), the time-reversal divisional multiple access technology leverages the unique temporal and spatial focusing effects of the time reversal phenomenon to provide cost-effective single-carrier broadband multi-user communication.

The time-reversal division multiple access scheme uses the multi-path channel profile associated with each user's location as a location-specific signature for the user. Each path of the multi-path channel is treated as a virtual antenna in the time-reversal division multiple access system, which collectively results in very high-resolution spatial focusing with "pin-point" accuracy. Meanwhile, the temporal focusing effect effectively suppresses inter-symbol interference which significantly simplifies the terminal user's complexity and gives rise to higher-speed data transmission.

The computer may function as a base station or be coupled to a base station that performs most of the signal processing when transmitting signals to the devices and receiving signals sent from the devices. The 2D parallel interference cancellation scheme allows multiple devices to communicate with the computer at the same time with reduced interference. For a specified bit error rate and data transmission rate, the 2D parallel interference cancellation scheme allows more devices to communicate with the computer simultaneously. For a specified bit error rate and number of devices, the 2D parallel interference cancellation scheme allows the devices to communicate with the computer at higher data transmission rates.

Overview of Time-Reversal System

The following provides an overview of a time-reversal system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travel through the propagation paths, the signal may become distorted and noise may be added. The multipath signal received by the second device 110 can be quite different from the signal transmitted by the first device 108.

Figure 2A:
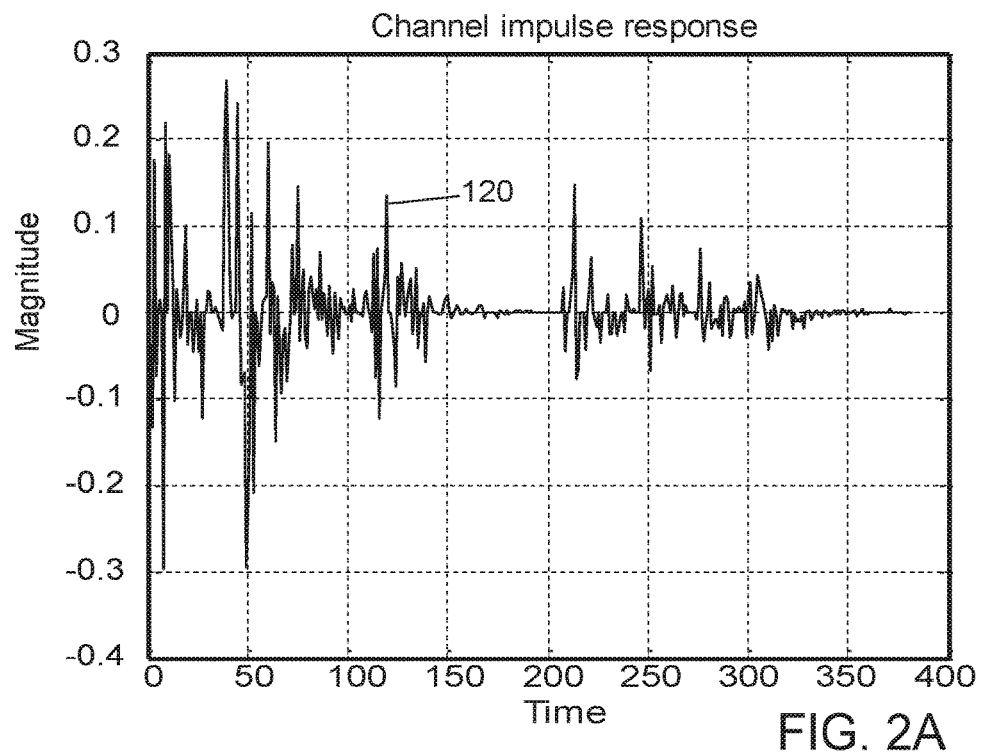
FIG. 2A is a graph of an exemplary recorded channel impulse response waveform.

For example, referring to FIG. 2A, when the first device 108 sends a pulse signal, the signal received by the second device 110 may have a waveform 120. The waveform 120 is referred to as the channel impulse response signal.

Figure 2B:
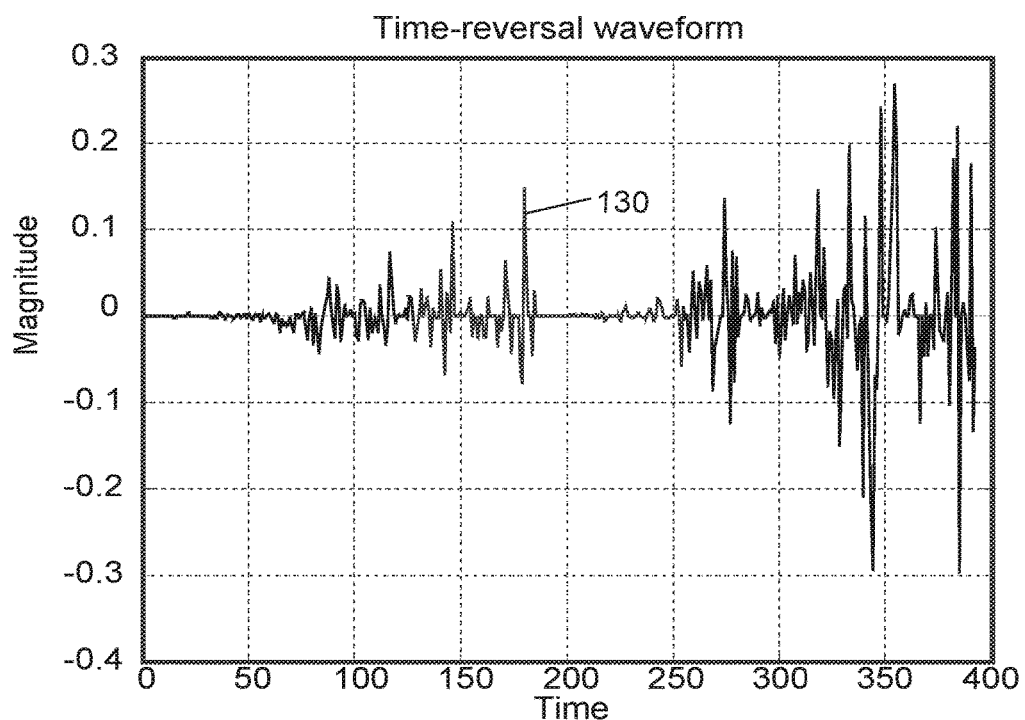
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 forms an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted.

When the second device 110 intends to transmit a data stream to the first device 108, the second device 110 uses normalized time-reversed conjugate signals as a basic waveform. The second device 110 loads the data stream on the basic waveform, and transmits the signal through the wireless channel. Usually the sampling rate is higher than the baud rate. The signal received at the receiver is the convolution of the transmitted signal and the channel impulse response, plus additive white Gaussian noise. The first device 108 performs a simple adjustment to the received signal and down-samples it to recover the data stream transmitted by the second device 110.

In some examples a transmitter may send signals to two or more receivers at the same time. The transmitted signal travel through multiple propagation paths to each receiver. Because the receivers are positioned at different locations, the multipath signals travel through different propagation paths to reach the receivers, different multipath signals will be received at different receivers. By carefully constructing the waveform of the signal sent from the transmitter, it is possible to allow each receiver to receive data intended for the receiver with sufficiently high quality.

Figure 3:
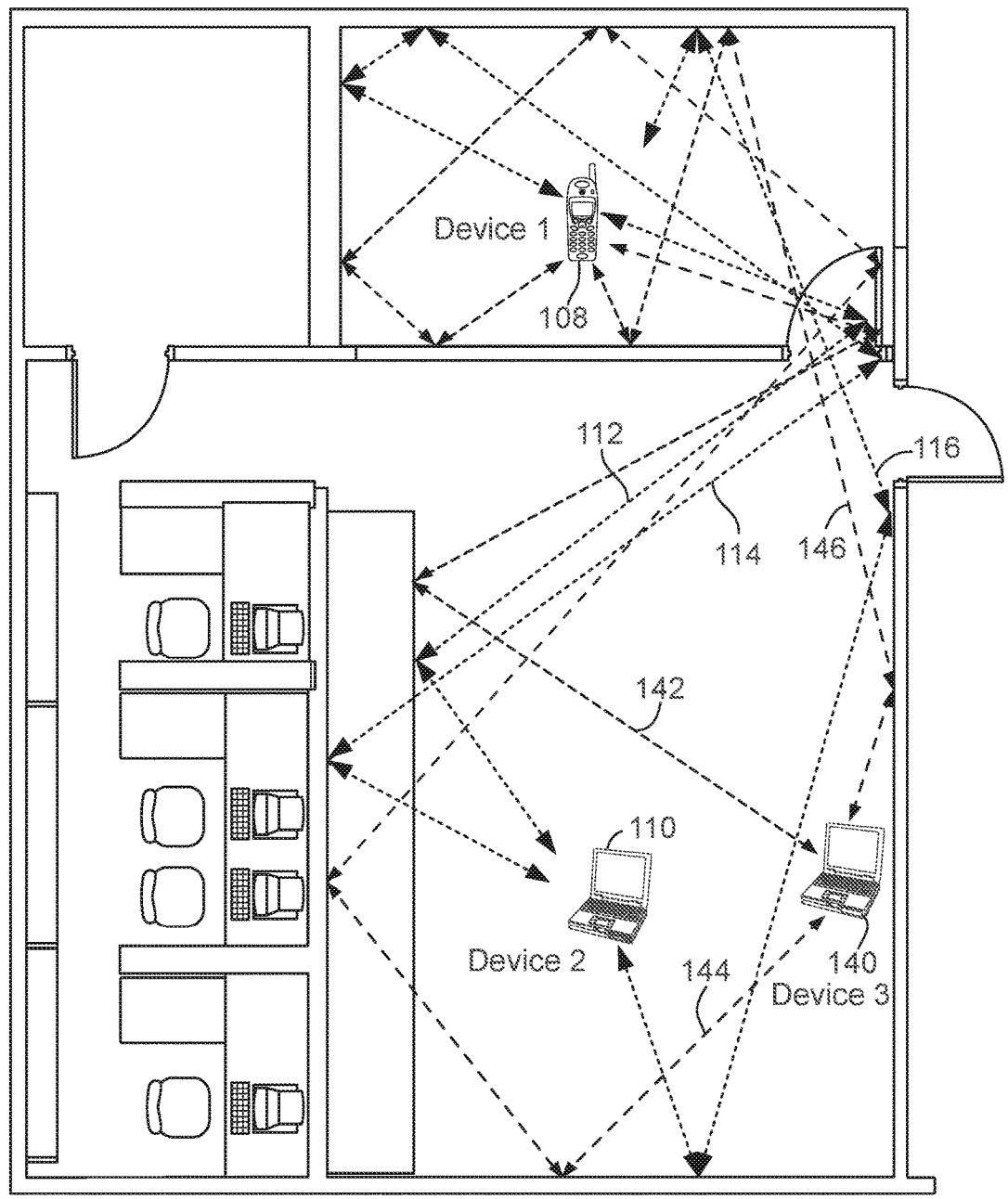
FIG. 3 is a diagram showing an exemplary environment for operating a time-reversal system having multiple receivers.

Referring to FIG. 3, the first device 108 may communicate with the second device 110 and a third device 140. The second device 110 sends a probe signal that travel through propagation paths 112, 114, and 116 to the first device 108. The probe signal can be, e.g., a pulse signal, a signal that has a predetermined waveform, or a signal that includes symbols. The first device 108 records the received waveform representing the channel response for the first multipath channel. The third device 110 sends a probe signal that travels through propagation paths 142, 144, and 146 to the first device 108. The first device 108 records the received waveform representing the channel response for the second multipath channel.

The first device 108 constructs a downlink signal based on a first time-reversed multipath channel response, a second time-reversed multipath channel response, a first data stream intended for the second receiver 110, and a second data stream intended for the third receiver 140. The first device 108 transmits the downlink signal so that a first portion of the downlink signal travels through propagation paths 112, 114, and 116 to reach the second device 110. A second portion of the downlink signal travel through propagation paths 142, 144, and 146 to reach the third device 140. The first signal portion received at the second device 110 forms the first data stream. The second signal portion received at the third device 140 forms the second data stream.

In the example of FIG. 3, the device operating as a transmitter may use either an omnidirectional antenna or a directional antenna for broadcasting the downlink signal, as long as the downlink signal reaches each of the receivers through multiple propagation paths.

In some examples, a multiple input multiple output (MIMO) system may be used in which the device operating as a transmitter has multiple transmit antennas, and each of the devices operating as a receiver has multiple receive antennas.

System Architecture

A time-reversal division multiple access architecture has two parts, the downlink part and the uplink part. In a time-reversal division multiple access downlink system, a base station (BS) transmits multiple data streams to several users simultaneously, in which each user is associated with a unique multi-path profile in rich-scattering environments. The time-reversal division multiple access downlink scheme exploits the spatial degrees of freedom of the environment and focuses the useful signal power mostly at the intended locations. Time reversal mirrors (TRMs) at the base station first time-reverse the channel response of each user's channel as the user's signature waveform, and then embed these signatures into the corresponding data streams. The transmitted signal from the base station in the time-reversal division multiple access downlink is a mixed signal that includes the data intended to be sent to several users (including different data intended for different users). When the combined signal propagates to a certain user through the corresponding multipath channel, a large number of multi-paths having identical phases will automatically resonate at this user's location, resulting in the spatial focusing of the power of the useful signal component that carries this user's data.

Within the time-reversal division multiple access framework, more sophisticated signature waveforms than the basic time-reversal waveform can be derived based on the multi-path channel responses to further improve the performance of the time-reversal division multiple access downlink system, when additional computational complexity is affordable at the base station. One desirable feature of the time-reversal division multiple access downlink scheme is that most of the complexity in communication can be shifted to the base station side, facilitating low complexity in communication components at the end-users.

A time-reversal division multiple access uplink scheme can be implemented in which the terminal devices have low complexity communication components. The time-reversal division multiple access uplink scheme shares a strong duality in the mathematical structure with the downlink without increasing the complexity of the end-users. A virtual spatial focusing effect can be observed in the user's signature domain at the base station. Similar to that of the downlink scheme, the virtual spatial focusing effect enables the base station to use the user's time-reversal signature waveform to extract the useful component from the combined received signals, allowing multiple users accessing the base station simultaneously. Additionally, unlike many other conventional communications paradigms that adopt symmetric architectures, the uplink scheme shares the same processing power and channel knowledge at the base station with the downlink, allowing the end-user's communication component to have a low complexity.

To further enhance the system performance of the time-reversal division multiple access uplink, a 2-dimensional (2D) parallel interference cancellation scheme is provided by exploring the signal structure of both the inter-symbol interference (ISI) (time dimension) and the inter-user interference (IUI) (user dimension). Compared with the existing multi-user detection (MUD) techniques for code division multiple access (CDMA) systems, the interference cancellation for the time-reversal division multiple access system has the following properties. The multi-path signature waveforms are not naturally orthogonal, so there may be more severe inter-user interference in time-reversal division multiple access than in a CDMA system. The time-reversal division multiple access system allows overlap between the transmitted signature waveforms to boost system throughput, which may cause inter-symbol interference, depending on the extent of overlapping.

A multi-user uplink scheme based on time-reversal division multiple access, and a 2D parallel interference cancellation technique for the time-reversal division multiple access uplink system are provided. Bearing a strong duality with the time-reversal division multiple access downlink, the time-reversal division multiple access uplink scheme reuses the processing power at the base station (BS) that has already been made available for the downlink, and keeps the complexity of the communication components of the terminal users at a low level. The 2D parallel interference cancellation scheme uses the tentative decisions of detected symbols to effectively cancel both the inter-symbol interference and inter-user interference at the base station. To further improve the bit error rate performance, a multi-stage processing can be performed by cascading multiple stages of cancellation, with a total delay that increases linearly with the number of stages, but independent of the number of users. Simulations are provided for up-to 3 stages of interference cancellation and compared with the basic time-reversal division multiple access system without interference cancellation.

Figure 4:
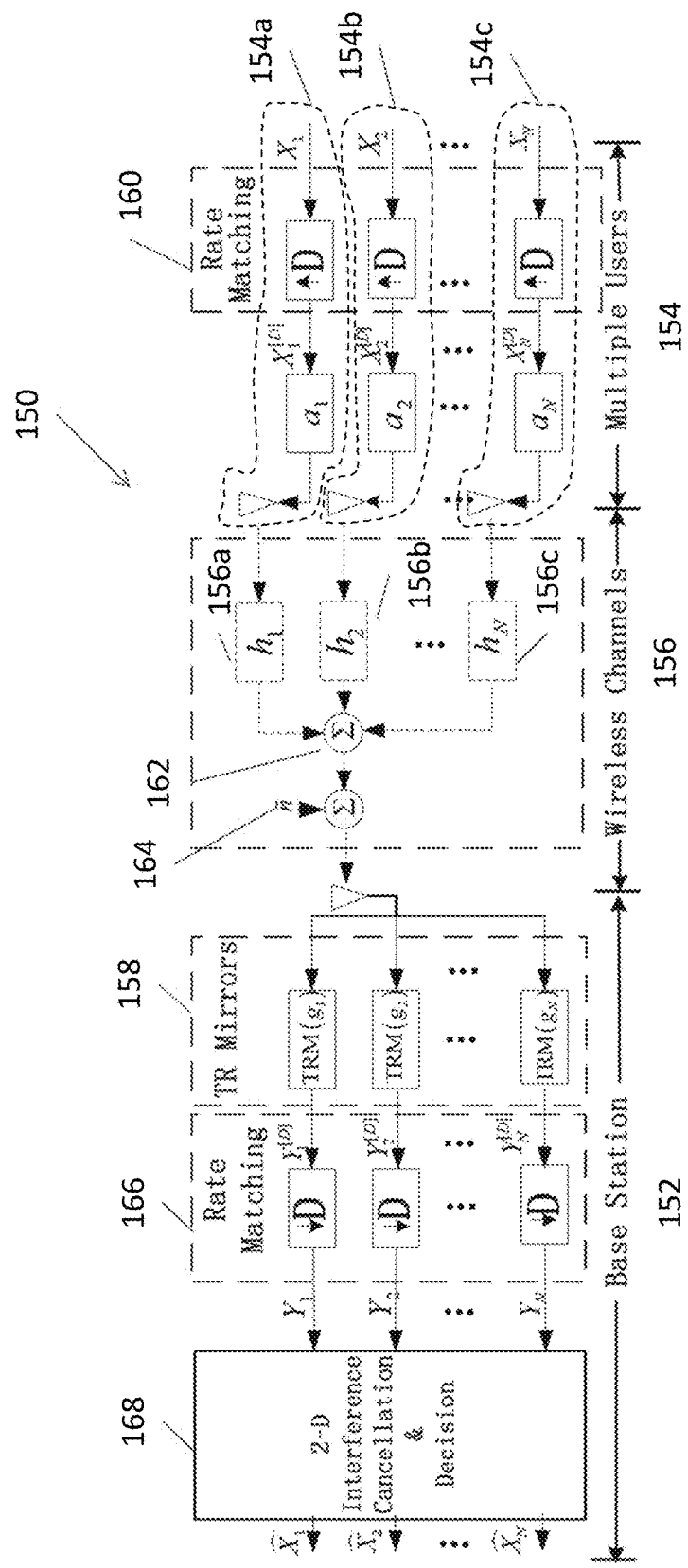
FIG. 4 is a diagram of an exemplary multi-user time reversal communication system.

Referring to FIG. 4, an exemplary broadband multi-user time reversal communication system 150 includes a base station 152 and multiple users or terminal devices (e.g., 154a, 154b, 154c, collectively 154). In this example, there are N users or terminal devices. Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band, and the system operates in multi-path environments. For the downlink, the base station 152 can send multiple messages (either independent or non-independent) simultaneously to multiple selected terminals 154. For the uplink, multiple terminals 154 can send their own messages to the base station 152 simultaneously.

The N users 154 simultaneously transmit independent bit streams to the base station 152. In this example, the binary phase-shift keying (BPSK) modulation is used, and the polarity of the modulated symbols $\{X_i[k] \in \{-1, +1\}\}$ carries the binary information for user i. Other types of modulations can also be used.

For any given user i in the uplink network, the channel $h_i$ 156 between the base station 152 and user i is a multi-path channel characterized by a unique discrete-time channel impulse response (CIR)

$$h_i[k] = \sum_{l=0}^{L-1} h_{i,l} \delta[k-l] \qquad \text{(Equ. 1)}$$

where $h_{i,l} \in \mathbb{R}$ is the l-th tap of the channel impulse response with length L, and $\delta[\bullet]$ is the Dirac delta function. We assume that the channels are quasi-static and reciprocal, in which information about the channels can be acquired at the base station through a channel probing phase.

During the channel probing phase, each user 154 takes turn to send a probe signal to the base station 152. The probe signal can be, e.g., a pulse signal, a signal that has a predetermined waveform, or a signal that includes symbols to enable the base station to perform synchronization and/or other functions. In the examples below, the probe signal is a pulse signal. However, other types of probe signals can be used in the system 150. When the probe signals are pulse signals, the channel impulse response $\{h_i[k]\}$ of each user's link are recorded by a time-reversal mirror 158 at the base station 152. Upon recording the channel impulse response, the time-reversal mirror 158 will reverse the recorded waveform in the time domain and normalize it as the unique signature waveform of user i. The time-reversed waveform of user i will be used in the uplink data transmission phase to extract the desired signal from a combination of the multiple access signals that are mixed in the air. Specifically, the time-reversed signature waveform of user i can be written as $$g_i[k] = h_i[L-1-k] \bigg/ \sqrt{\sum_{l=0}^{L-1} |h_i[l]|^2} \qquad \text{(Equ. 2)}$$

After the channel probing phase, the users 154 can start to transmit the statistically independent messages $\{X_1[k], X_2[k], \ldots, X_N[k]\}$ to the base station 152 through the multi-path channels 156. Each device 154 has a rate matching module 160 that introduces a rate back-off factor D to match the symbol rate (signal bandwidth) with the higher system sampling rate (channel bandwidth). For any user $U_i$, $i \in \{1, 2, \ldots, N\}$, the rate matching process is performed by up-sampling the sequence of modulated symbols $\{X_i[k]\}$ by a factor D. The up-sampled sequence of modulated symbols for user i can be expressed as $$X_i^{[D]}[k] = \begin{cases} X_i[k/D], & \text{if } k \bmod D = 0, \\ 0, & \text{if } k \bmod D \neq 0 \end{cases} \qquad \text{(Equ. 3)}$$

The scaling factors $a_i$, for $i \in \{1, 2, \ldots, N\}$ in FIG. 4 are used to implement the transmit power control, whose values are assumed to be instructed by the base station 152 through the feedback/control channel. After multiplying with scaling factor, the sequence of $a_i X_i^{[D]}[k]$ for all $i \in \{1, 2, \ldots, N\}$, is transmitted through the corresponding multi-path channel $\{h_i[k]\}$.

When the sequence $\{a_i X_i^{[D]}[k]\}$ propagates through its wireless channel $\{h_i[k]\}$ 156, the convolution between $\{a_i X_i^{[D]}[k]\}$ and the channel impulse response $\{h_i[k]\}$ is automatically taken as the channel output for user i. All of the channel outputs for the N users are mixed together in the air, as represented by the summation symbol 162. White Gaussian noise (AWGN) ñ[k] 164 with zero mean and variance $\sigma_N^2$ is added to the mixed signal. The mixed signal received at the base station 152 can be written as $$S[k] = \sum_{i=1}^{N} a_i(h_i * X_i^{[D]})[k] + \tilde{n}[k]. \qquad \text{(Equ. 4)}$$

Upon receiving the mixed signal, the base station 152 passes this mixed signal through a bank of N time-reversal mirrors 158, each of which performs the convolution between its input signal $\{S[k]\}$ and the user's signature waveform $\{g_i[k]\}$. Such a convolution using the signature waveform extracts the useful signal component and suppresses the signals of the other users. As the output of the i-th time-reversal mirror 158, the convolution of $\{S[k]\}$ and the signature of user i $\{g_i[k]\}$ can be represented as $$Y_i^{[D]}[k] = \sum_{j=1}^{N} a_j(g_i * h_j * X_j^{[D]})[k] + (g_i * \tilde{n})[k] = \qquad \text{(Equ. 5)}$$

$$\sum_{j=1}^{N} \sum_{l=0}^{2L-2} a_j(g_i * h_j)[l] X_j^{[D]}[k-l] + (g_i * \tilde{n})[k],$$

in which the highest gain for user i's symbol is achieved at the temporal focusing time l=L−1, with $$(g_i * h_i)[L-1] = \sqrt{\sum_{l=0}^{L-1} |h_i[l]|^2} \qquad \text{(Equ. 6)}$$

Comparing Equation 5 and the received signal at the terminal users in the downlink, the same mathematical structure can be found by switching the roles of the signature waveforms $\{g_i\}$s and the channel impulse responses $h_i$s in the convolution (and ignoring the scaling factor $a_i$ and noise term). Therefore, mathematically, a virtual spatial focusing effect as observed in the downlink can be seen in the user's signature domain of the uplink scheme. Unlike the physical spatial focusing effect observed in the downlink in which the useful signal power is concentrated at different physical locations, in the uplink, the signal power concentration in the users' signature waveform space is achieved mathematically at the base station 152. Such a virtual spatial focusing effect is used to separate the useful signal from the signals of other users. The base station 152 includes a rate matching module 166 to perform rate matching by down-sampling (with the same factor D) the time-reversal mirror's output signal to recover the original symbol rate of the modulated symbols of each user.

After the rate matching, the down-sampled time-reversal mirror output $Y_i[k]$ can be represented as $$Y_i[k] = \sum_{j=1}^{N} \sum_{l=-\lfloor \frac{L-1}{D} \rfloor}^{\lfloor \frac{L-1}{D} \rfloor} a_j(g_i * h_j)[L-1+Dl]X_j[k-l] + n_i[k] \qquad \text{(Equ. 7)}$$

where the colored noise $n_i[k] = \sum_{l=0}^{L-1} g_i[l]\tilde{n}[Dk-l] = \underline{g_i}\underline{\tilde{n}}[k]$ with $\underline{g_i} = [g_i[0], g_i[1], \ldots, g_i[L-1]]$ and $\underline{\tilde{n}}[k] = [\tilde{n}[k], \tilde{n}[k-1], \ldots, \tilde{n}[k-L+1]]^T$.

A more rigorous representation of Yi[k] is $Y_i[k] = Y_i^{[D]}[L-1+Dk]$, which aligns the highest temporal focusing gain (gi*hi)[L−1] in Yi[k] with the transmitted symbol Xi[k] in time for ease of simple notation. Note that the colored noise $\{n_i[k]\}$ is a Gaussian random variable with zero mean and has the variance $\sigma_N^2$, since $\{g_i\}$ is a normalized waveform represented by Equation 2.

Decomposing the signal shown in Equation 7, we have the following components as $$Y_i[k] = a_i(g_i * h_i)[L-1]X_i[k] \quad \text{(Signal)} + \qquad \text{(Equ. 8)}$$

$$a_i \sum_{\substack{l=-\lfloor \frac{L-1}{D} \rfloor \\ l \neq 0}}^{\lfloor \frac{L-1}{D} \rfloor} (g_i * h_i)[L-1+Dl]X_i[k-l] \quad (ISI) +$$

$$\sum_{\substack{j=1 \\ j \neq i}}^{N} a_j \sum_{l=-\lfloor \frac{L-1}{D} \rfloor}^{\lfloor \frac{L-1}{D} \rfloor} (g_i * h_j)[L-1+Dl]X_j[k-l] \quad (IUI) +$$

$$n_i[k] \quad \text{(Noise)}$$

The basic time-reversal division multiple access uplink scheme uses the signal $Y_i[k]$ in Equation 7 to estimate the transmitted symbol $X_i[k]$. A simple decision rule can be derived to implement the maximum-likelihood estimation (MLE) for the binary phase-shift keying symbols $X_i[k] \in \{+1, -1\}$ for $i=1, 2, \ldots, N$. By the central limit theorem, we model the total interference term (including the inter-symbol interference and inter-user interference) as a Gaussian random variable with zero mean (because the interference term is a linear combination of the zero-mean binary symmetric symbols $Xi[k] \in \{+1,-1\}$) and variance $$\sigma_{I,i}^2 = |a_i|^2 \sum_{\substack{l=-\lfloor\frac{L-1}{D}\rfloor \\ l \neq 0}}^{\lfloor\frac{L-1}{D}\rfloor} |(g_i * h_i)[L-1+Dl]|^2 +$$

$$\sum_{\substack{j=1 \\ j \neq i}}^{N} |a_j|^2 \sum_{l=-\lfloor\frac{L-1}{D}\rfloor}^{\lfloor\frac{L-1}{D}\rfloor} |(g_i * h_j)[L-1+Dl]|^2.$$

The likelihood ratio can be derived as $$\Lambda(Y_i[k]) = \frac{L(X_i[k]=1|Y_i[k])}{L(X_i[k]=-1|Y_i[k])} =$$

$$\frac{f_i[Y_i[k] \mid X_i[k]=1]}{f_i[Y_i[k] \mid X_i[k]=-1]} = \exp\left(\frac{2a_i(g_i * h_i)[L-1]}{(\sigma_{I,i}^2 + \sigma_{N,i}^2)} Y_i[k]\right)$$

where $f_i(y|x)$ is the conditional probability density function (pdf) of $Y_i[k]$ given that $X_i[k]=x$ is transmitted. The simple form of the likelihood ratio shown in Equation 9 leads to a simple decision rule for the maximum-likelihood estimation, specifically, $$\hat{X}_i^{(0)}[k] = \operatorname{sgn}(Y_i[k]) = \begin{cases} +1, & \text{if } Y_i[k] \geq 0, \\ -1, & \text{if } Y_i[k] < 0 \end{cases}. \quad \text{(Equ. 10)}$$

In Equation 10, the superscript "(0)" of $\hat{X}_i^{(0)}[k]$ indicates the initial stage of the interference cancellation procedure. Such a notation is useful in the following discussion of multi-stage interference cancellation schemes.

The error probability of the estimator shown in Equation 10 can be calculated based on the Gaussian approximations of the interference as follows $$P_{err}^{(0)}(i) = Q\left(\sqrt{\frac{|a_i|^2 \sum_{l=0}^{L-1} |h_i[l]|^2}{\sigma_{I,i}^2 + \sigma_N^2}}\right) = Q\left(\sqrt{SINR_i^{(0)}}\right) \quad \text{(Equ. 11)}$$

Where $SINR_i^{(0)}$ is the signal-to-interference-plus-noise ratio (SINR) for user i at the initial stage. From Equation 11, one can see that the error probability decreases with the achieved signal-to-interference-plus-noise ratio, i.e., the quality of the signal before the final decision.

The base station 152 includes a 2D interference cancellation and decision module 168 that cancels the inter-symbol interference and the inter-user interference. The following describes the 2D interference cancellation scheme that uses the estimated symbols to effectively cancel both the inter-symbol interference and inter-user interference, and significantly improves the performance of the uplink communication.

2-Dimensional Parallel Interference Cancelation

The 2D parallel interference cancellation scheme used by the 2D interference cancelation and decision module 168 can have one or more stages. A single stage 2D parallel interference cancellation scheme is described first. The time-reversal division multiple access system is an interference-limited system, especially in the high signal-to-noise ratio (SNR) regime. The interference terms shown in Equation 8 have structures that can be exploited to improve the bit error rate performances. Because the channel impulse responses have been obtained at the base station 152 during the channel probing phase, the interference terms in Equation 8 can be reconstructed if the relevant transmitted symbols are known. Note that the coefficients $\{a_i\}$ are determined by the base station 152 and sent to the users 154. In the interference cancellation scheme described here, the estimated symbols from the previous stage are used to approximate the interference terms in the current stage. The basic time-reversal division multiple access system (without interference cancelation) is considered as the initial (0-th) stage of the interference cancellation. The interference cancellation of the time-reversal division multiple access system includes two parts belonging to two different dimensions. The inter-symbol interference is due to the multi-path effect of broadband channels, which is in the time domain. The inter-user interference is caused by the simultaneous transmission of multiple users, which is in the user's signature domain. The 2D parallel interference cancellation scheme for the time-reversal division multiple access uplink system targets the interference in both dimensions by exploiting the structure of interference in both dimensions.

Tentative Decision Vector

Due to the unique structure of time-reversal waveforms, each received symbol may include interference caused by the symbols transmitted before and after the current symbol. According to Equation 8, in order to ideally cancel the interference for user i's symbol $X_i[k]$, one has to know all the other users' transmitted symbols from time $$\left(k - \left\lfloor\frac{L-1}{D}\right\rfloor\right) \text{ to } \left(k + \left\lfloor\frac{L-1}{D}\right\rfloor\right)$$

for the inter-user interference; and user i's own transmitted symbols from time $$\left(k - \left\lfloor\frac{L-1}{D}\right\rfloor\right)$$

to (k−1) and from (k+1) to $$\left(k + \left\lfloor\frac{L-1}{D}\right\rfloor\right)$$

for the inter-symbol interference.

Tentative decisions are made in an attempt to estimate these symbols. To simplify the notation in the sequel, define the vector $\hat{X}_j^{(0)}[k]$ for all $j \in \{1, 2, \ldots, N\}$, as the stage-0 tentative decision vector for user j, where $$\hat{X}_j^{(0)}[k] \triangleq = \quad (12)$$

-continued $$\hat{\underline{X}}_j^{(0)}[k] \triangleq \left[\hat{X}_j^{(0)}\left[k+\left\lfloor\frac{L-1}{D}\right\rfloor\right], \hat{X}_j^{(0)}\left[k+\left\lfloor\frac{L-1}{D}\right\rfloor-1\right], \ldots, \right.$$
$$\left.\hat{X}_j^{(0)}\left[k-\left\lfloor\frac{L-1}{D}\right\rfloor\right]\right]^T$$
$$= \left[\text{sgn}\left(Y_j\left[k+\left\lfloor\frac{L-1}{D}\right\rfloor\right]\right), \text{sgn}\left(Y_j\left[k+\left\lfloor\frac{L-1}{D}\right\rfloor-1\right]\right), \ldots, \right.$$
$$\left.\text{sgn}\left(Y_j\left[k-\left\lfloor\frac{L-1}{D}\right\rfloor\right]\right)\right]^T.$$

Since the stage-0 tentative decisions for user j solely depend on this user's own time-reversal mirror 158 output, the tentative decision vectors can be obtained in parallel for all the users in the 2D parallel interference cancellation scheme.

Approximated Interference Reconstruction

Based on the tentative decisions of the transmitted symbols, the approximated interference terms in Equation 8 can be reconstructed by looking at the structure of the inter-symbol interference and the inter-user interference. In doing so, we first define the row vector $U_{i,j}$ for $\forall i,j \in \{1, 2, \ldots, N\}$ as $$U_{i,j} \triangleq \left[(g_i * h_j)\left[L-1-D\left\lfloor\frac{L-1}{D}\right\rfloor\right],\right. \quad \text{(Equ. 13)}$$
$$(g_i * h_j)\left[L-1-D\left(\left\lfloor\frac{L-1}{D}\right\rfloor-1\right)\right],$$
$$\left.\ldots, (g_i * h_j)\left[L-1+D\left\lfloor\frac{L-1}{D}\right\rfloor\right]\right],$$

so that the inter-symbol interference canceller vector and the inter-user interference canceller vector can be easily represented as described below.

Considering the inter-symbol interference to $X_i[k]$ as a linear combination of user i's own symbols, we define the inter-symbol interference canceller vector $V_{i,i}$ for user i to be $$V_{i,i} \triangleq U_{i,i} D(\underline{1}, 0, \underline{1}), \quad \text{(Equ. 14)}$$

where $D(\underline{z})$ is a diagonal matrix whose diagonal elements are listed by $\underline{z}$, and $\underline{1} \triangleq \{1, 1, \ldots, 1\}$ of length $$\left\lfloor\frac{L-1}{D}\right\rfloor.$$

As a result, the approximated inter-symbol interference term for user i's symbol $X_i[k]$ can be written in a compact form as the product of the inter-symbol interference canceller vector $V_{i,i}$ and the tentative decision vector $\hat{\underline{X}}_i^{(0)}[k]$ as shown below $$ISI = a_i \sum_{\substack{l=-\lfloor\frac{L-1}{D}\rfloor \\ l \neq 0}}^{\lfloor\frac{L-1}{D}\rfloor} (g_i * h_i)[L-1+Dl]\hat{X}_i[k-l] = a_i V_{i,i}\hat{\underline{X}}_i^{(0)}[k]. \quad \text{(Equ. 15)}$$

We define the inter-user interference canceller vector for the inter-user interference caused by user j to user i as $U_{i,j}$, so that the estimated inter-user interference term to be canceled for user i's symbol $X_i[k]$ can be obtained as $$IUI = \sum_{\substack{j=1 \\ j \neq i}}^{N} a_j \sum_{l=-\lfloor\frac{L-1}{D}\rfloor}^{\lfloor\frac{L-1}{D}\rfloor} (g_i * h_i)[L-1+Dl]\hat{X}_j[k-l] = \quad \text{(Equ. 16)}$$
$$\sum_{\substack{j=1 \\ j \neq i}}^{N} a_j U_{i,j} \hat{\underline{X}}_j^{(0)}[k].$$

Single-Stage 2D Interference Cancellation

Figures 1, 5A:
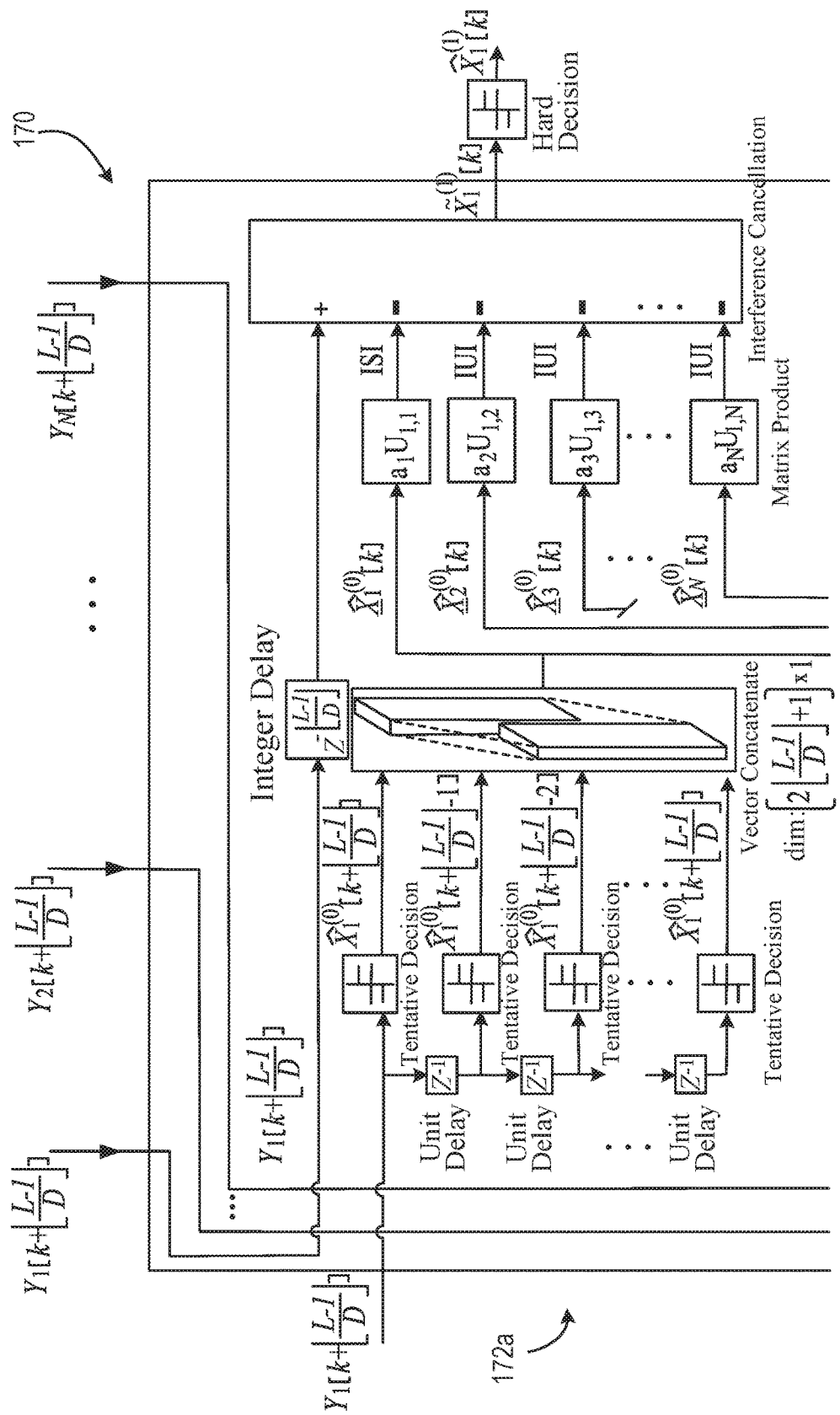
FIGS. 5A and 5B are diagrams showing an exemplary 2D interference cancelation and decision module.
Figures 2, 5A:
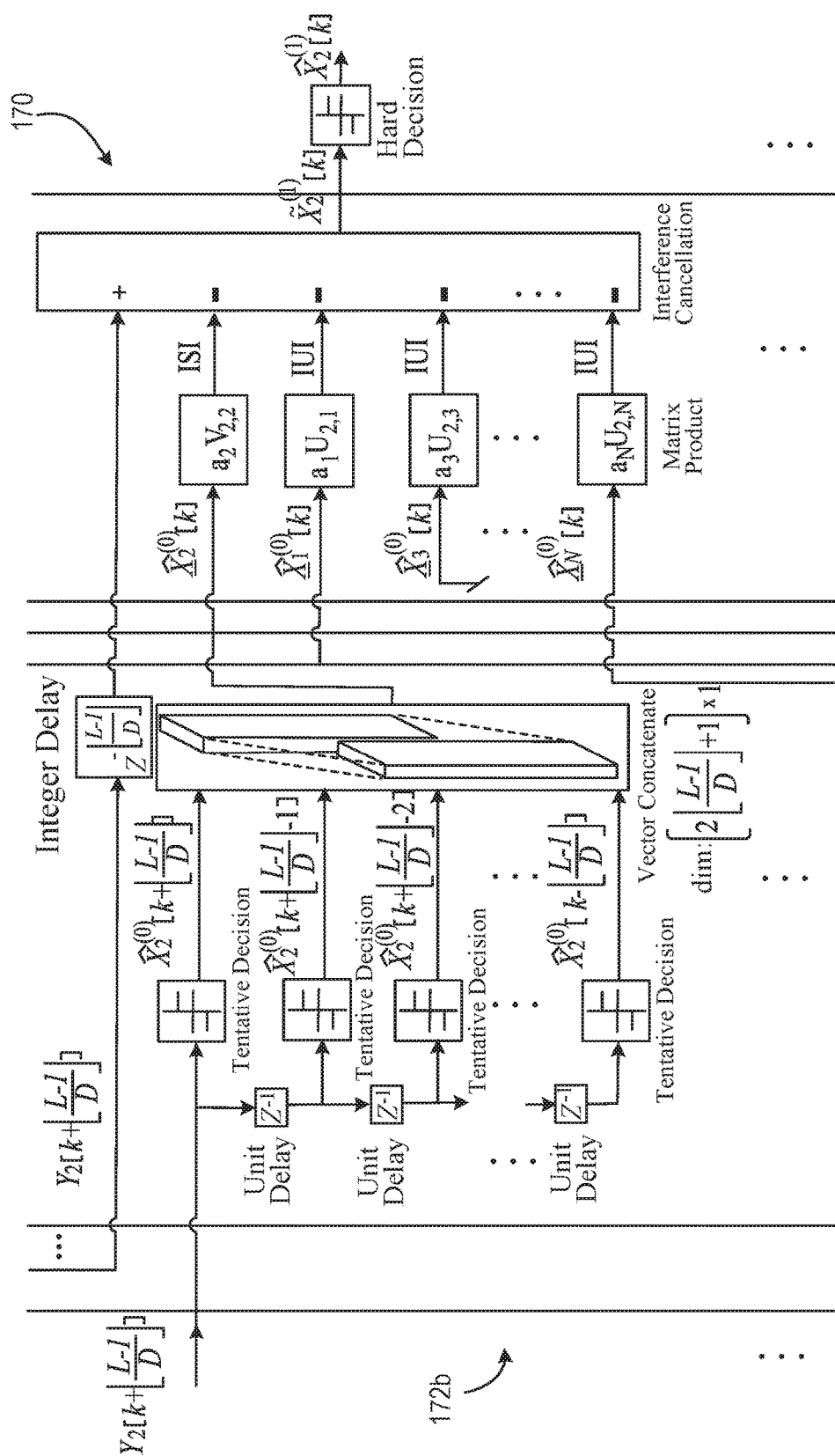
Figures 3, 5A:
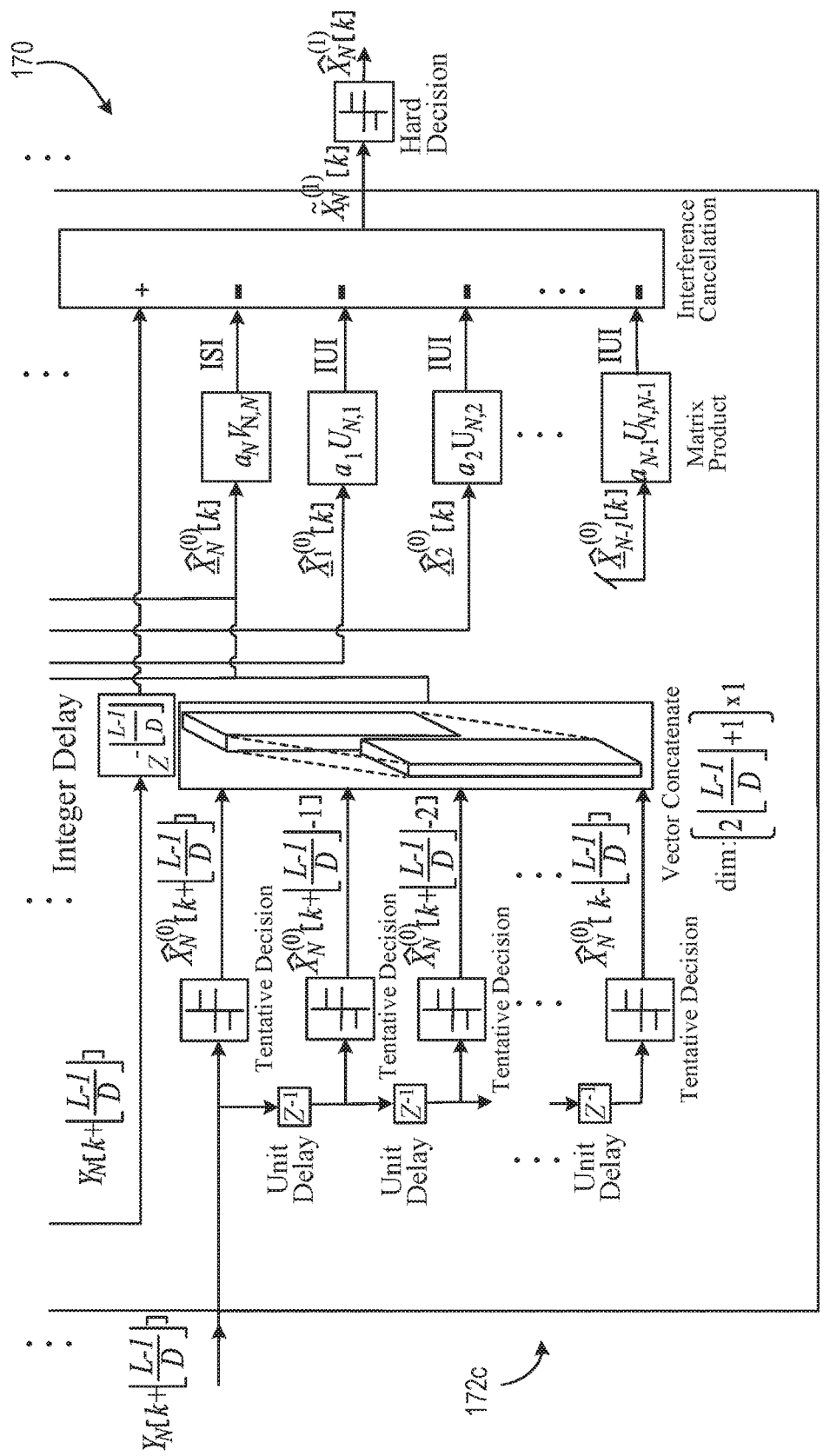

Referring to FIG. 5A, in some implementations, a 2D interference cancelation and decision module 170 uses a single-stage 2D parallel interference cancellation scheme. The 2D interference cancelation and decision module 170 includes N interference cancelation and decision module units (e.g., 172a, 172b, 172c, collectively 172) each canceling the interference associated with symbols sent from one of the users 154. In this example, the interference cancelation and decision module unit 172a cancels the inter-symbol interference and the inter-user interference from the symbols sent from the user 154a, the unit 172b cancels the interference from the symbols sent from the user 154b, the unit 172c cancels the interference from the symbols sent from the user 154c, and so forth.

Figure 5B:
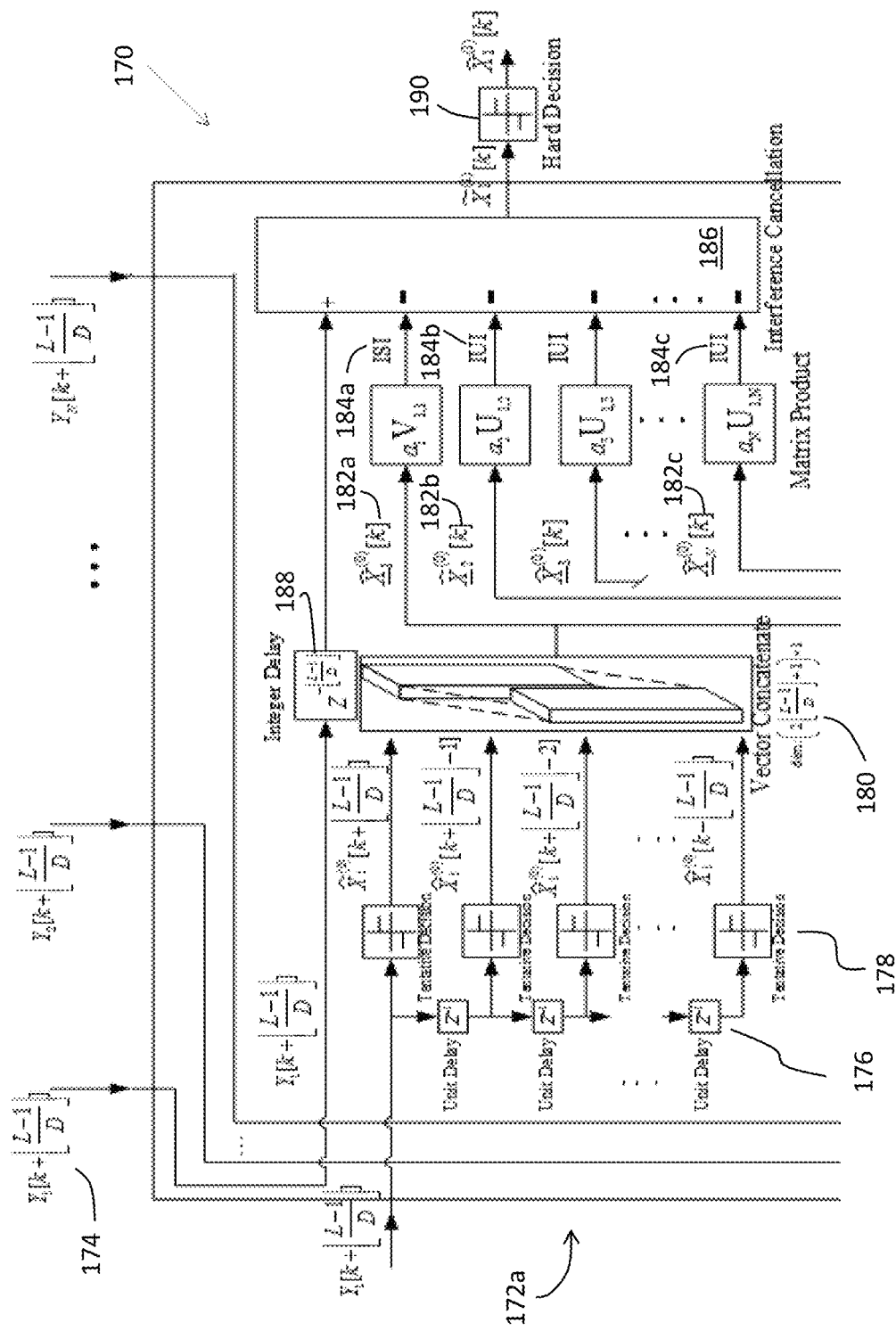

FIG. 5B shows an enlarge diagram of the interference cancelation and decision module unit 172a. The input signal $Y_1[k]$ 174 associated with user 1 (154a) is buffered by a delay chain 176 of length $$2\left\lfloor\frac{L-1}{D}\right\rfloor.$$

Tentative hard decision units 178 make tentative hard decisions in parallel for the signal associated with user 1, and the tentative hard decisions are concatenated at a concatenation unit 180 to obtain a vector $\hat{\underline{X}}_1^{(0)}$ 182 using the decision rule of Equation 10. The vector $\hat{\underline{X}}_1^{(0)}$ 182 represents the tentative hard decisions for user 1.

The matrix product of vector $\hat{\underline{X}}_1^{(0)}$ 182 and the inter-symbol interference canceller vector $V_{11}$, scaled by a power coefficient $a_1$, is calculated to obtain the inter-symbol interference $ISI_{1,1}$ (184a) associated with the symbols sent from user 1.

The matrix product of a vector $\hat{\underline{X}}_1^{(0)}$ 182b and the inter-user interference canceller vector $U_{1,2}$, scaled by a power coefficient $a_2$, is calculated to obtain the inter-user interference $IUI_{1,2}$ (184b) representing the interference of user 2 (154b) to user 1.

In a similar manner, the matrix product of a vector $\hat{\underline{X}}_N^{(0)}$ and the inter-user interference canceller vector $U_{1,N}$, scaled by a power coefficient $a_N$, is calculated to obtain the inter-user interference $IUI_{1,N}$ representing the interference of user N to user 1.

An interference cancellation module 186 subtracts the inter-symbol interference $ISI_{1,1}$ (184a) and inter-user interferences $IUI_{1,2}$ (184b) to $IUI_{1,N}$ (184c) from the time-reversal mirror output $Y_1[k]$ to obtain a soft bit representing a refined estimate of the symbol sent from user 1, represented as $\hat{X}_1^{(1)}[k]$. The soft bit passes a hard decision unit 190, which outputs a hard decision of the symbol sent from user 1, represented as $\hat{X}_1^{(1)}[k]$. The superscript (1) indicates that this is the hard decision for stage 1 interference cancelation.

In general, at each interference cancelation and decision module unit 172i (i=1 to N), the input signal Yi[k] associated with the i-th user is buffered by a delay chain of length $$2\left\lfloor\frac{L-1}{D}\right\rfloor.$$

Tentative hard decision units make tentative hard decisions in parallel for the signal associated with user i, and the tentative hard decisions are concatenated at a concatenation unit to obtain a vector $\underline{\hat{X}}_i^{(0)}[k]$ for $\forall i \in \{1, 2, \ldots, N\}$ using the decision rule of Equation 10. The vector $\underline{\hat{X}}_i^{(0)}$ represents the tentative hard decisions for user i.

The matrix product of vector $\underline{\hat{X}}_i^{(0)}$ and the inter-symbol interference canceller vector $V_{i,i}$, scaled by a power coefficient $a_i$, is calculated to obtain the inter-symbol interference $ISI_i$ associated with the symbols sent from the user i.

The matrix product of each of vectors $\underline{\hat{X}}_j^{(0)}$ (j≠i) and the inter-user interference canceller vector $\underline{U}_{i,j}$, scaled by a power coefficient $a_j$, is calculated to obtain the inter-user interference $IUI_{i,j}$ representing the interference of user j to user i.

An interference cancellation module 186 subtracts the inter-symbol interference $IUI_i$ and inter-user interferences $IUI_{i,j}$ (for all j not equal to i) from the time-reversal mirror output $Y_i[k]$ to obtain a soft bit representing a refined estimate of the symbol sent from user i, represented as $\tilde{X}_i^{(1)}[k]$. The soft bit passes a hard decision unit, which outputs a refined hard decision of the symbol sent from user i, represented as $\hat{X}_i^{(1)}[k]$. The superscript (1) indicates that this is the hard decision for stage 1 interference cancelation.

Mathematical derivations of the final hard decision $\hat{X}_i^{(1)}[k]$ are provided below. As described above, upon obtaining the tentative decision vectors $\underline{\hat{X}}_i^{(0)}[k]$ for all $i \in \{1, 2, \ldots, N\}$, the interference terms are reconstructed and then subtracted from the signal $Y_i[k]$ with the inter-symbol interference and inter-user interference canceller vectors.

Similar to the definition in Equation 12, denoting $$X_j[k] \triangleq \left[X_j\left[k+\left\lfloor\frac{L-1}{D}\right\rfloor\right], X_j\left[k+\left\lfloor\frac{L-1}{D}\right\rfloor-1\right], \ldots, X_j\left[k-\left\lfloor\frac{L-1}{D}\right\rfloor\right]\right]^T,$$

we can rewrite Equation 8 in a more compact form as $$Y_i[k] = \quad \text{(Equ. 17)}$$
$$a_i\sqrt{\sum_{l=0}^{L-1}|hi[l]|^2}\, X_i[k] + a_i V_{i,i} X_i[k] + \sum_{\substack{j=1 \\ j\neq i}}^{N} a_j U_{i,j} X_j[k] + n_i[k].$$

After the interference cancellation, the resulting soft-bit $\tilde{X}_i^{(1)}[k]$ can be written as $$\tilde{X}_i^{(1)}[k] = Y_i[k] - a_i V_{i,i}\hat{X}_i^{(0)}[k] - \sum_{\substack{j=1 \\ j\neq i}}^{N} a_j U_{i,j}\hat{X}_j^{(0)}[k] \quad \text{(Equ. 18)}$$

A hard decision $\hat{X}_i^{(1)}[k]=\mathrm{sgn}(\tilde{X}_i^{(1)}[k])$ can be made based on $\tilde{X}_i^{(1)}[k]$ to achieve a more refined estimation for the transmitted symbol.

The Multi-Stage Iterative Scheme

To further improve the detection performance, a multi-stage processing can be performed by cascading multiple stages of the 2D parallel interference cancellation. In this part, we generalize the basic single-stage scheme into an iterative multi-stage scheme, in which the signal quality is refined after each stage of interference cancellation. This is useful when, e.g., the bit error rate performance of the initial stage is not sufficiently high.

Figure 6:
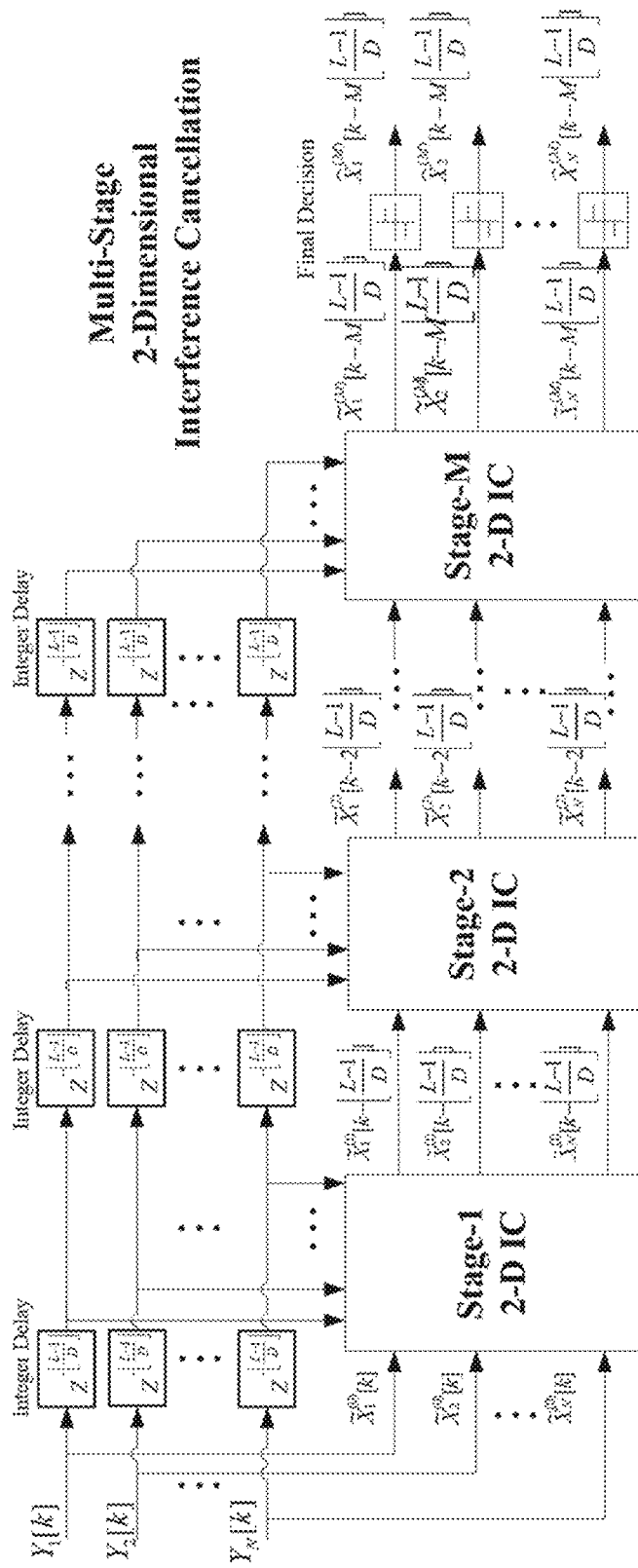
FIG. 6 is a diagram showing a multi-stage 2D interference cancelation and decision module.

Referring to FIG. 6, a 2D interference cancelation and decision module 200 uses an M-stage interference cancellation scheme. As the interference cancellation procedures proceed in each stage, the same 2D parallel interference cancellation is performed in an attempt to remove both the inter-symbol interference and the inter-user interference with the updated estimates of the transmitted symbols. Each stage takes the soft-bits from the previous stage as input, based on which tentative decisions are made to estimate the interference and generate the soft-bits of the current stage as the output.

More specifically, in the context of multiple stages, the m-th stage's operation can be described as follows:

Delay and Buffering: The soft-bits from the previous stage (the (m−1)-th stage) are delayed and buffered to form a soft-bit vector for each user, such that for all $i \in \{1, 2, \ldots, N\}$, $$\underline{\hat{X}}_i^{(m-1)}\left[k-m\left\lfloor\frac{L-1}{D}\right\rfloor\right] \triangleq \left[\tilde{x}_i^{(m-1)}\left[k-(m-1)\left\lfloor\frac{L-1}{D}\right\rfloor\right],\right. \quad \text{(Equ. 19)}$$
$$\tilde{x}_i^{(m-1)}\left[k-(m-1)\left\lfloor\frac{L-1}{D}\right\rfloor-1\right],$$
$$\left.\ldots, \tilde{x}_i^{(m-1)}\left[k-(m+1)\left\lfloor\frac{L-1}{D}\right\rfloor\right]\right]$$

Tentative Decision: The tentative decisions are made based on the soft-bits from the previous stage (the (m−1)-th stage) in an attempt to estimate the transmitted symbols, i.e., for all $i \in \{1, 2, \ldots, N\}$, $$\hat{\underline{X}}_i^{(m-1)}\left[k-m\left\lfloor\frac{L-1}{D}\right\rfloor\right] = \mathrm{sgn}\left(\hat{\underline{x}}_i^{(m-1)}\left[k-m\left\lfloor\frac{L-1}{D}\right\rfloor\right]\right) \quad \text{(Equ. 20)}$$

where sgn(•) is the sign function applied element-wise to the operand when the operand is a vector.

Interference Cancellation: The soft-bits of the current stage (the m-th stage) are generated by subtracting the estimated interference terms from the original signals $\{Y_i\}$. The soft-bit of user i generated by the m-th stage is given by $$\hat{x}_i^{(m)}\left[k-m\left\lfloor\frac{L-1}{D}\right\rfloor\right] = Y_i\left[k-m\left\lfloor\frac{L-1}{D}\right\rfloor\right] - \quad \text{(21)}$$
$$a_i V_{i,i}\hat{\underline{X}}_i^{(m-1)}\left[k-m\left\lfloor\frac{L-1}{D}\right\rfloor\right] - \sum_{\substack{j=1 \\ j\neq i}}^{N} a_j U_{i,j}\hat{\underline{X}}_j^{(m-1)}\left[k-m\left\lfloor\frac{L-1}{D}\right\rfloor\right]$$

In particular, such an M-stage scheme is initialized by setting the soft-bits of the initial stage (the 0-th stage) as $$\tilde{X}_1^{(0)}[k]=Y_1[k], \tilde{X}_2^{(0)}[k]=Y_2[k], \ldots, \tilde{X}_N^{(0)}[k]=Y_N[k] \quad \text{(Equ. 22)}$$

After the signal flows through all the M stages, the final decision is made for each user based on the output of the stage-M interference cancellation, $$\hat{X}_i^{(m)}\left[k - m\left\lfloor\frac{L-1}{D}\right\rfloor\right] = \text{sgn}\left(\hat{X}_i^{(M)}\left[k - m\left\lfloor\frac{L-1}{D}\right\rfloor\right]\right), \quad \text{(Equ. 23)}$$

for all $i \in \{1, 2, \ldots, N\}$

Comparing the timing of the estimated symbols after the final decision $$\hat{X}_i^{(M)}\left[k - M\left\lfloor\frac{L-1}{D}\right\rfloor\right]$$

and the original time-reversal mirror output signal $Y_i[k]$, one can see that each stage incurs a delay of $$\left\lfloor\frac{L-1}{D}\right\rfloor.$$

Therefore, the total detection delay grows linearly with the number of stages, but is independent of the number of users. The complexity of the 2D parallel interference cancellation increases linearly with the number of users (or devices), as opposed to previous joint detection schemes whose complexity grows exponentially with the number of users.

Simulation Results

The following describes simulation results on the bit error rate performance of the 2D parallel interference cancellation scheme. To study the interference cancellation scheme in a realistic setting, we used the practical IEEE 802.15.4a outdoor non-line-of-sight (NLOS) channel model to evaluate the bit error rate performance of the time-reversal system shown in FIGS. 4-6. In such a channel model, each channel tap is a real number.

Referring to FIG. 7A, a graph 220 shows an example of a channel impulse response for user 1 under the IEEE 802.15.4a outdoor non-line-of-sight channel model.

Referring to FIG. 7B, a graph 222 shows an example of a channel impulse response for user 2 under the IEEE 802.15.4a outdoor non-line-of-sight channel model.

Referring to FIG. 8A, a graph 224 shows the convolution of the channel impulse response for user 1 with the time-reversal signature waveform for user 1.

Referring to FIG. 8B, a graph 226 shows the convolution of the channel impulse response for user 2 with the time-reversal signature waveform for user 1.

The channels used for the simulations for the examples shown in FIGS. 7A and 7B are randomly generated according to the channel model specified in IEEE 802.15.4a, with the system sampling period $T_s=1$ ns and the channel length truncated (because the amplitude of the remaining paths after 300 ns is typically small enough to be neglected) at $LT_s=300$ ns (i.e., $L=300$).

In FIG. 8A, the convolution between user 1's channel impulse response $h_1$ and its matched time-reversal signature waveform $g_i$ exhibits a prominent central peak 228 at $(h_1 * g_1)[L-1]$, demonstrating the temporal focusing effect of the time-reversal technique.

In FIG. 8B, the amplitude of the convolution between the time-reversal signature waveform $g_1$ and the mismatched channel impulse response $h_2$ is significantly smaller than the central peak $(h_1 * g_1)[L-1]$ shown in FIG. 8A, demonstrating the virtual spatial focusing effect in the user's signature domain.

The following provides numerical evaluations on the bit error rate performance of the 2D interference cancellation scheme. In the simulations, the channel impulse responses for various users are randomly and independently generated using the IEEE 8.2.15.4a channel model, with $T_s=1$ ns and $L=300$. Without loss of generality, the channel impulse response of each user is normalized so that $$\sum_{k=0}^{L-1} |h_i[k]|^2 = 1,$$

$$\forall i \in \{1, 2, \ldots, N\},$$

and assume that all the power control coefficients $a_i=1$, $\forall i \in \{1, 2, \ldots, N\}$. This provides equal power allocation among the users.

A large number of independent trials of channel realizations were conducted and averaged to characterize the average performance of the interference cancellation scheme under this channel model.

Bit Error Rate Versus $E_b/N_0$

The following describes the bit error rate performance versus $E_b/N_0$ (the energy-per-bit to noise-power-spectral-density ratio) with various combinations of rate back-off factor D and the total number of users N. The energy-per-bit $E_b$ is normalized to 1 by the assumption that each BPSK symbol $X_i[k] \in \{-1,+1\}$ has a unit power. Accordingly, the power of the received additive white Gaussian noise (AWGN) $\tilde{n}[k]$ at the base station is given by $$\sigma_N^2 = \frac{N_0}{2} = \left(\frac{2E_b}{N_0}\right)^{-1}.$$

Figure 9:
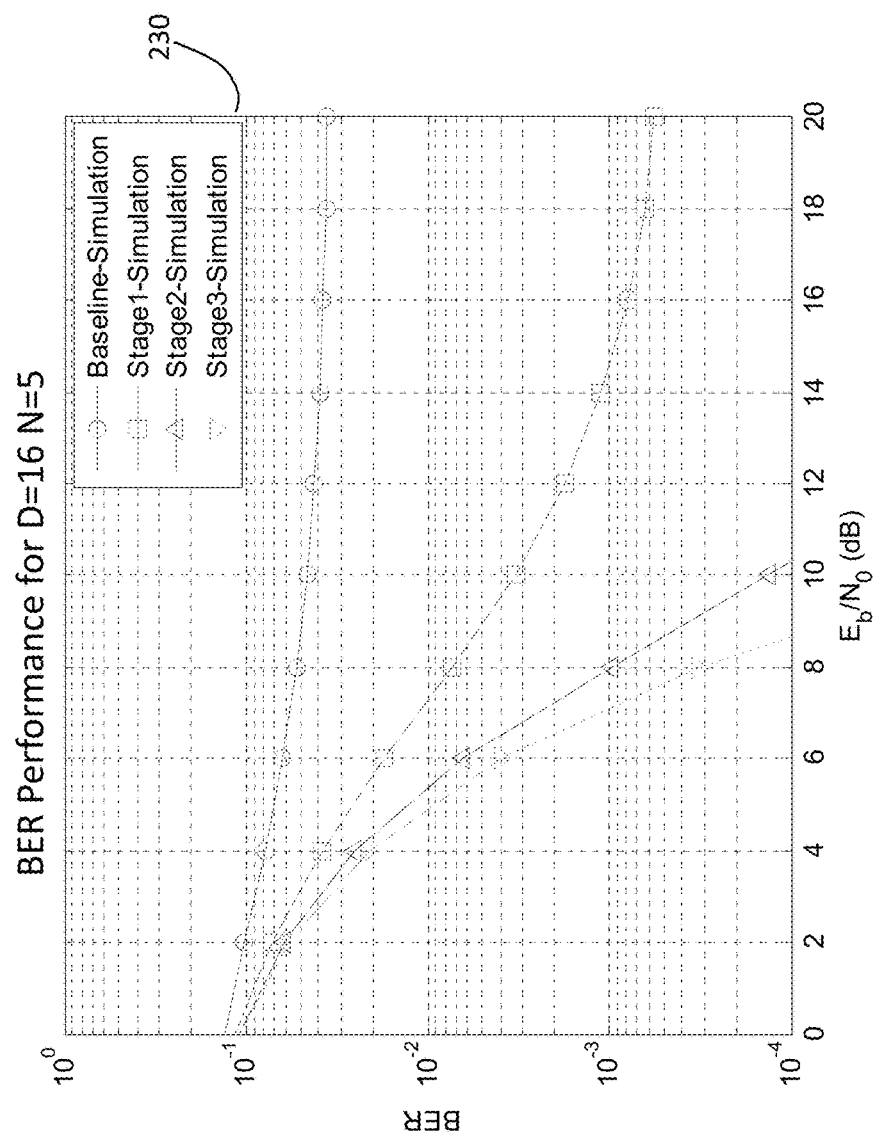
FIGS. 9 to 12 are graphs showing the bit error rate performances of the time reversal system using 2D parallel interference cancellation under various operation conditions.

Referring to FIG. 9, a graph 230 shows the bit error rate performances of the 2D parallel interference cancellation scheme (up to 3 stages), compared with the basic time-reversal division multiple access system without interference cancellation. In the example of FIG. 9, the simulation considers that case where there are N=5 end-users accessing the base station at the same time with a rate back-off factor D=16 (about 5.3% of the channel length L=300).

Figure 10:
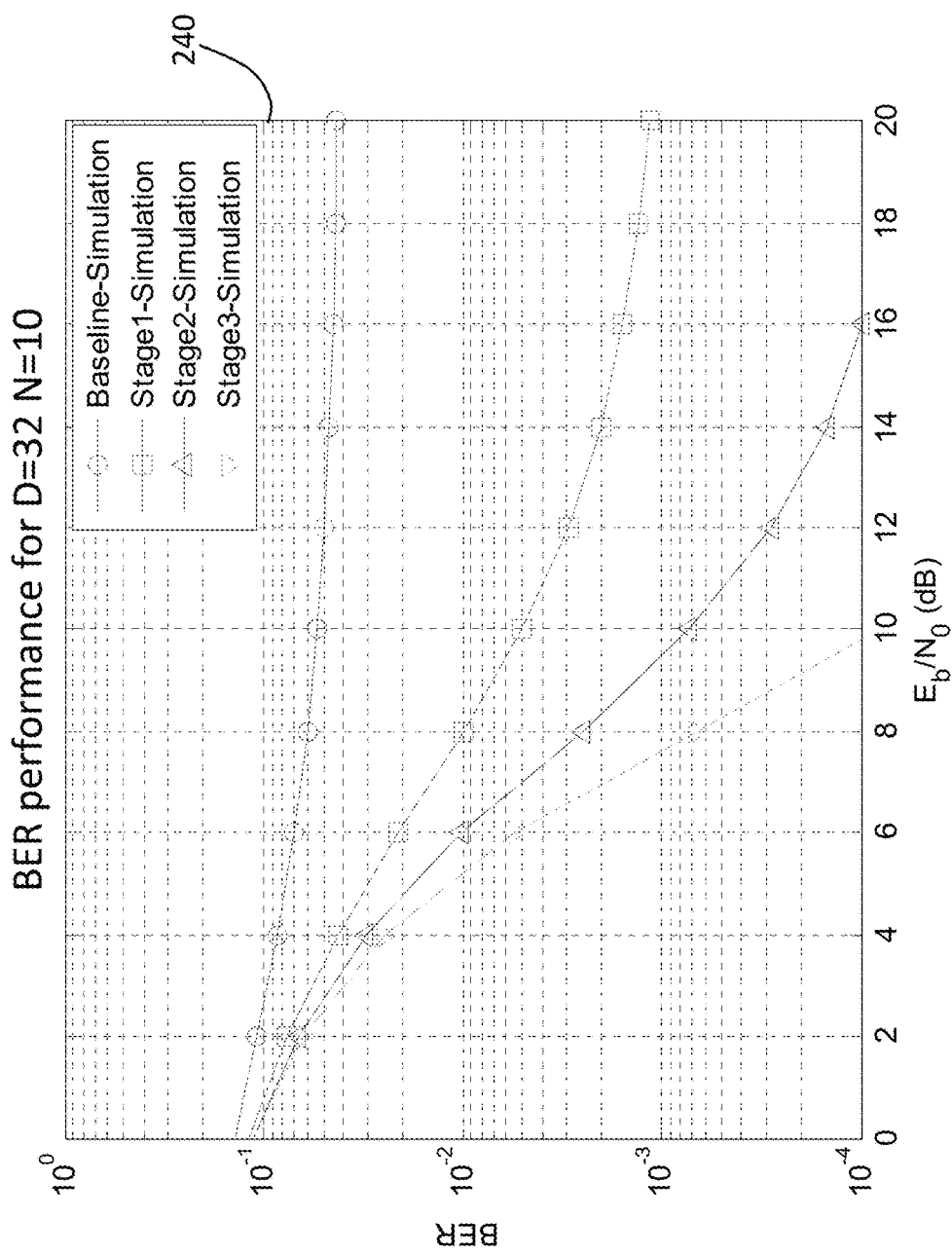

Referring to FIG. 10, a graph 240 shows the bit error rate performances of the 2D parallel interference cancellation scheme (up to 3 stages), compared with the basic time-reversal division multiple access system without interference cancellation. In the example of FIG. 10, the simulation considers that case where there N=10 end-users accessing the base station at the same time with a rate back-off factor D=32 (about 10.7% of the channel length).

FIGS. 9 and 10 show that significant bit error rate performance gain is achieved by the 2D parallel interference cancellation scheme, compared with the baseline time-reversal division multiple access system without interference cancellation. Additional gain can be achieved by cascading more stages of the interference cancellation scheme, at the price of increased decoding delay that grows linearly with the total number of stages. The largest gain-per-stage is obtained by the first stage, with the marginal gain diminishes for the following stages. There is a tradeoff between the system performance and the number of stages, and different tradeoffs can be considered for different applications. The theoretical approximation derived above matches reasonably well with the simulation results, considering its complicated correlation between tentative decisions and the Gaussian assumptions that were made in the approximation. A comparison of FIGS. 9 and 10 shows that the accuracy of the approximation improves as the number of users increases, which agrees with the central limit theorem.

High Signal-to-Noise Ratio Regime

Figure 11:
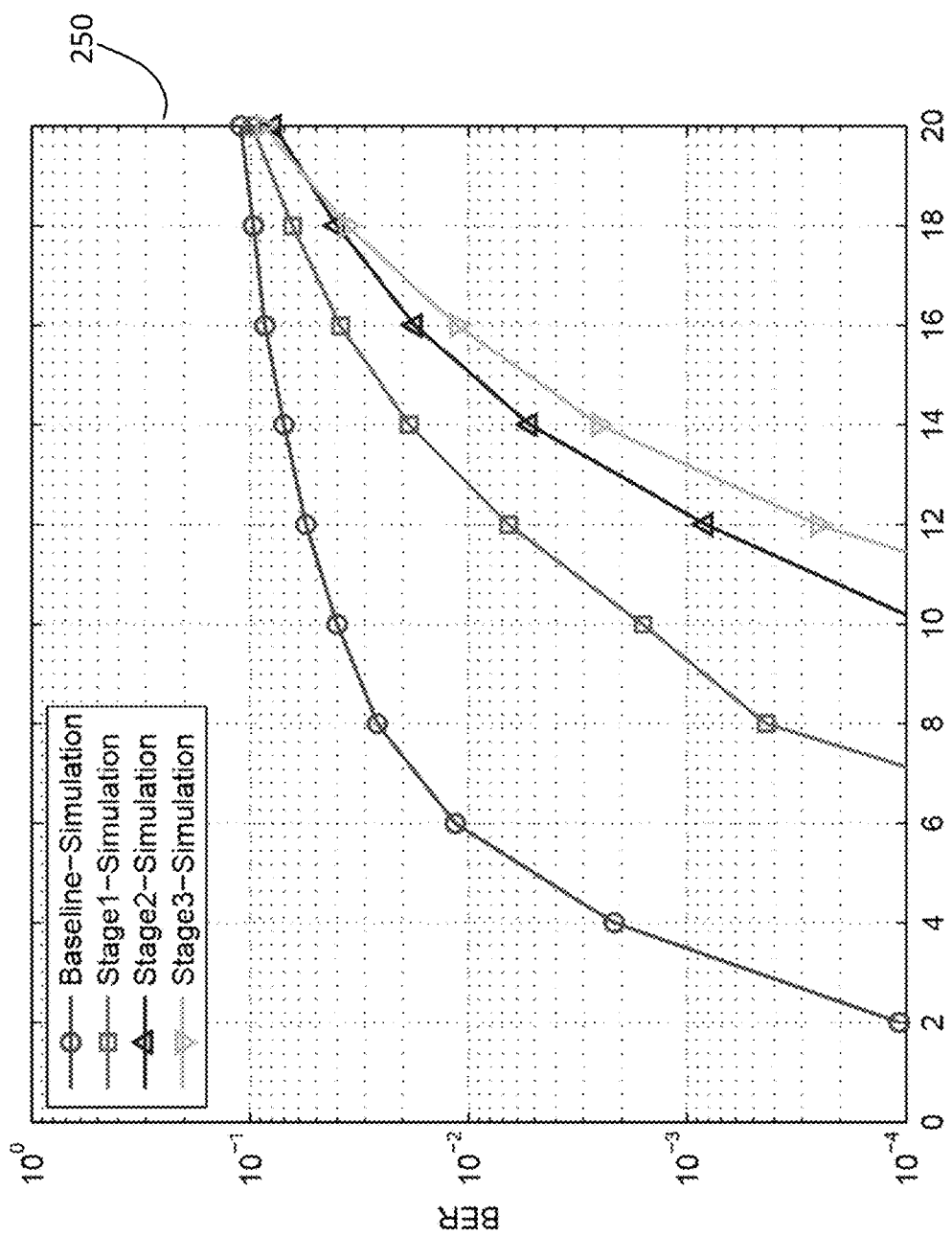

Referring to FIG. 11, a graph 250 shows how the bit error rate performance changes with the number of users N with a high signal-to-noise ratio. In this example, the rate back-off factor D=32. The graph 250 shows that the bit error rate increases with the number of users N due to the increased inter-user interference. Targeting at a certain bit error rate level (e.g., $10^{-3}$), the 2D interference cancellation enables more users to transmit simultaneously and therefore increases the system capacity. The benefit of using the interference cancellation diminishes when the bit error rate of the baseline system (considered as the initial stage) is above a certain threshold. This is because the fact that the interference cancellation scheme at the receiver eventually relies on the tentative decisions of the detected symbols to cancel the interference, whose effectiveness depends on the quality of those tentative decisions.

Figure 12:
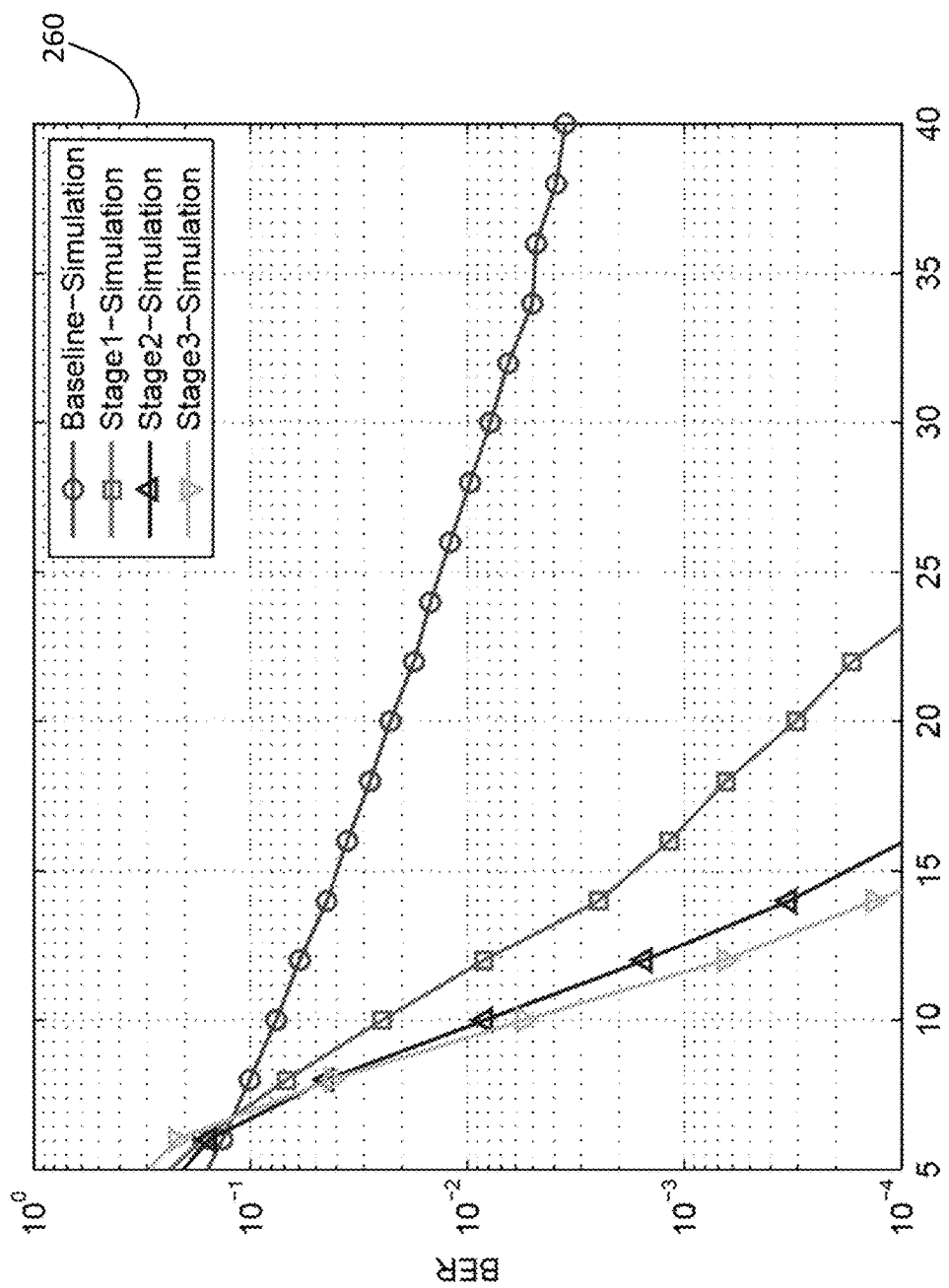

Referring to FIG. 12, a graph 260 shows how the bit error rate performance is affected by the rate back-off factor D with high signal-to-noise ratio, assuming that there are 5 users accessing the base station simultaneously. Because both the inter-symbol interference and the inter-user interference are reduced with a larger rate back-off factor D, the bit error rate decreases as D increases. The graph 260 shows that by using the 2D parallel interference cancellation scheme, the time-reversal division multiple access system can use a smaller D to achieve the same bit error rate, which translates to higher throughput for each user. When D is small (e.g., for D=6 (only 2% of the channel length)), there can be more erroneous tentative decisions (i.e., high bit error rate (greater than $10^{-1}$) for the initial stage), which in turn enhances the interference power, rather than canceling the interference. However, most practical time-reversal division multiple access applications operate at a much lower bit error rate level, so the interference cancellation scheme will not contribute to additional interference. Note that a lower bit error rate level can be achieved by increasing the rate back-off factor D and/or reducing the number of concurrent users N, thereby increasing the accuracy of the tentative decisions at the initial stage.

Figure 13:
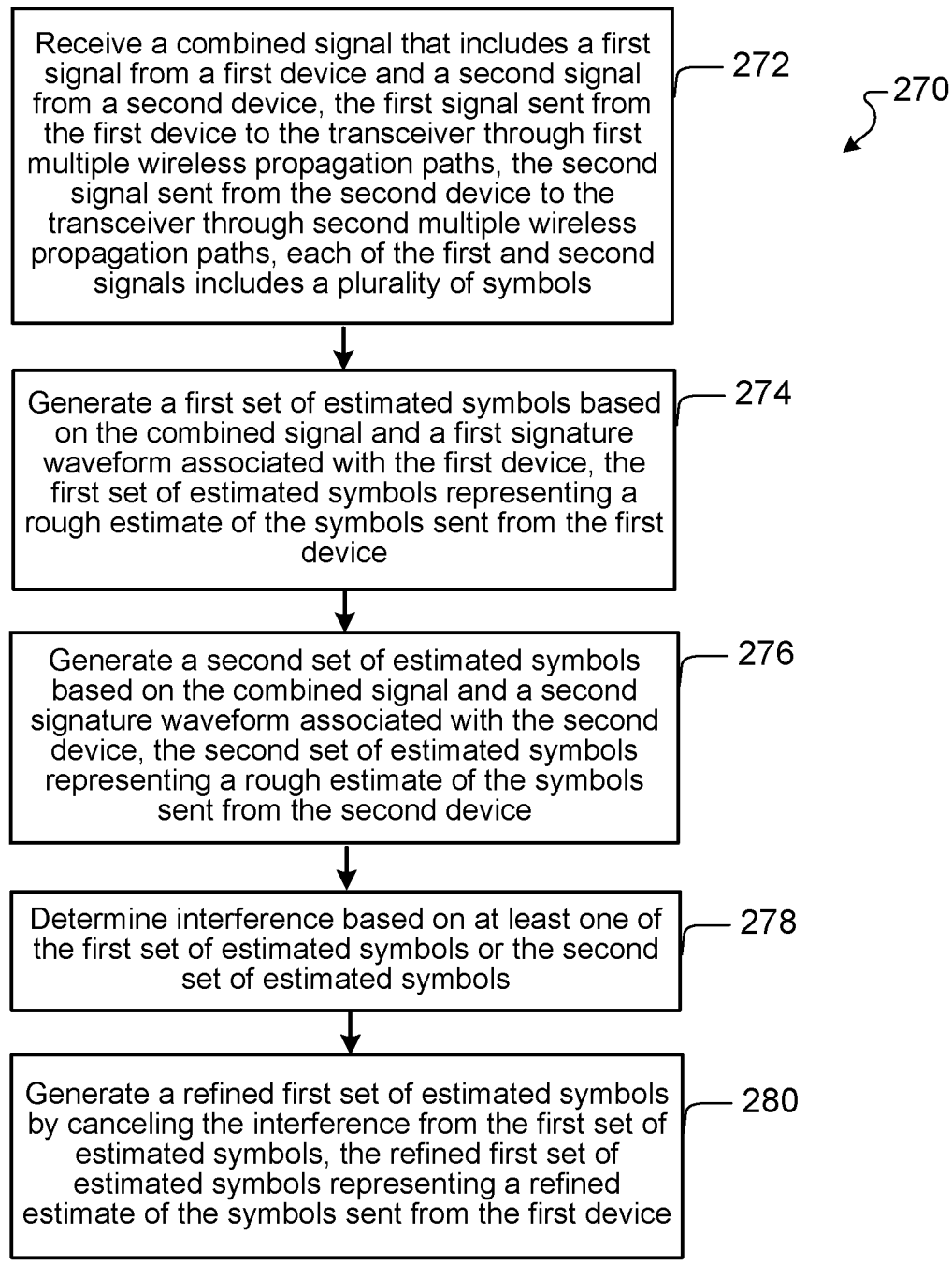
FIGS. 13-15 are flow diagrams of exemplary processes for asymmetric time-reversal wireless communication with interference cancellation.

Referring to FIG. 13, a process 270 for time-reversal wireless communication with interference cancellation is provided. For example, the process 270 can be implemented by the base station 152 of FIG. 4. The process 270 includes at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths, each of the first and second signals includes a plurality of symbols (272). For example, the transceiver can be part of the base station 152, the first device can be the first terminal device 154a, and the second device can be the second terminal device 154b.

The process 270 includes generating a first set of estimated symbols based on the combined signal and a first signature waveform associated with the first device, the first set of estimated symbols representing a rough estimate of the symbols sent from the first device (274). For example, the base station 152 can apply a signature waveform associated with the first terminal device 154a to a combined signal to generate a first set of estimated symbols, e.g., according to Equation 5.

The process 270 includes generating a second set of estimated symbols based on the combined signal and a second signature waveform associated with the second device, the second set of estimated symbols representing a rough estimate of the symbols sent from the second device (276). For example, the base station 152 can apply a signature waveform associated with the second terminal device 154b to the combined signal to generate a second set of estimated symbols, e.g., according to Equation 5.

The process 270 includes determining interference based on at least one of the first set of estimated symbols or the second set of estimated symbols (278). For example, the base station 152 can determine the interference, which can include inter-symbol interference and/or inter-user interference. For the first set of estimated symbols, the inter-symbol interference can be determined based on the first set of estimated symbols, and the inter-user interference can be determined based on the second set of estimated symbols. For the second set of estimated symbols, the inter-symbol interference can be determined based on the second set of estimated symbols, and the inter-user interference can be determined based on the first set of estimated symbols. For example, the interference can be determined according to Equations 15 and 16.

The process 270 includes generating a refined first set of estimated symbols by canceling the interference from the first set of estimated symbols, the refined first set of estimated symbols representing a refined estimate of the symbols sent from the first device (280). For example, the base station 152 can generate the refined first set of estimated symbols by subtracting the inter-symbol interference and/or the inter-user interference from the first set of estimated symbols, e.g., according to Equation 18.

Figure 14:
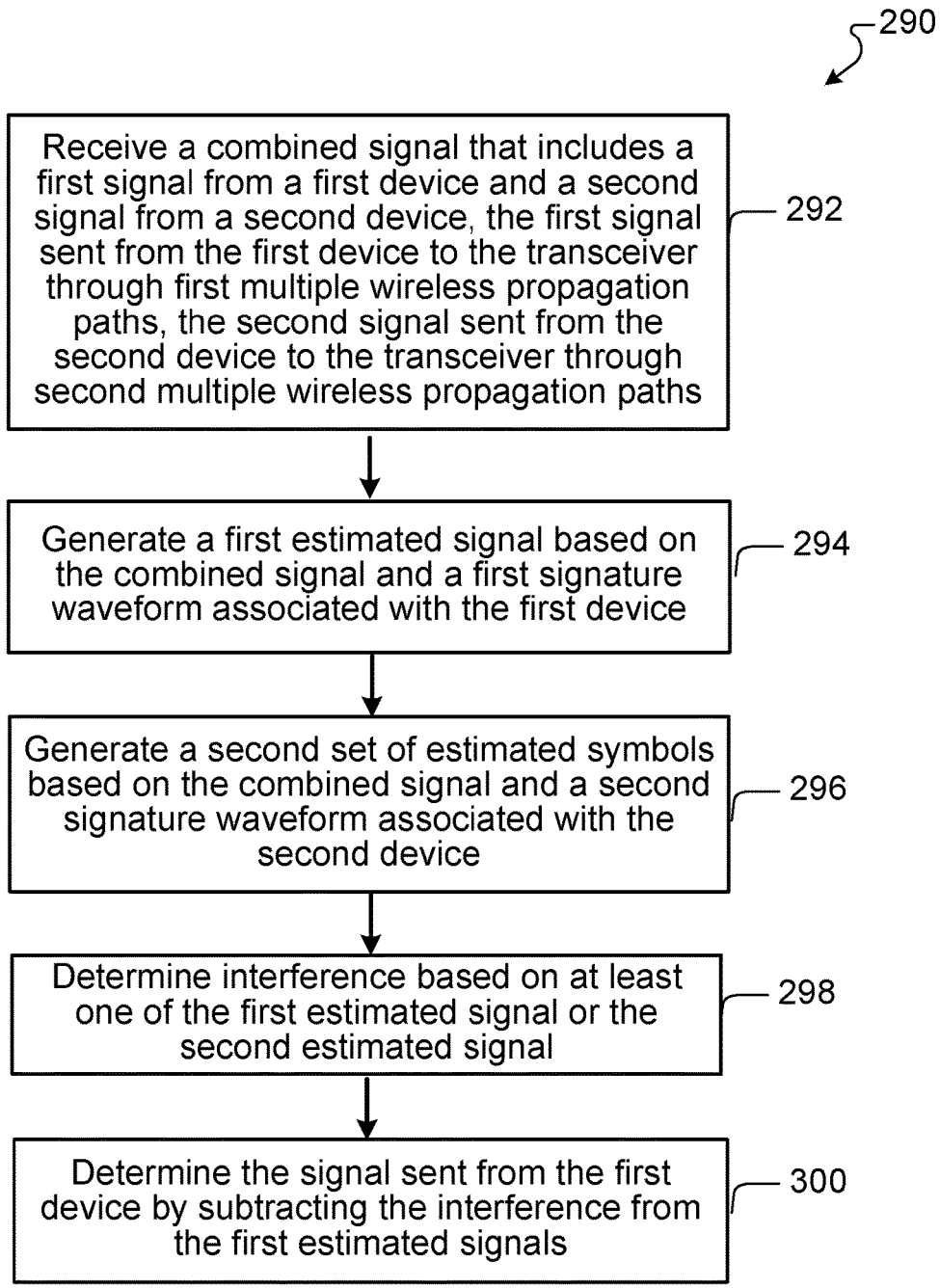

Referring to FIG. 14, a process 290 for time-reversal wireless communication with interference cancellation is provided. For example, the process 290 can be implemented by the base station 152 of FIG. 4. The process 290 includes at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths (292). For example, the transceiver can be part of the base station 152, the first device can be the first terminal device 154a, and the second device can be the second terminal device 154b.

The process 290 includes estimating the first signal sent from the first device to generate a first estimated signal based on the combined signal and a first signature waveform associated with the first device (294). For example, the base station 152 can apply a signature waveform associated with the first terminal device 154a to a combined signal to generate a first estimated signal.

The process 290 includes estimating the second signal sent from the second device to generate a second estimated signal based on the combined signal and a second signature waveform associated with the second device (296). For example, the base station 152 can apply a signature waveform associated with the second terminal device 154b to the combined signal to generate a second estimated signal.

The process 290 includes determining interference based on at least one of the first estimated signal or the second estimated signal (298). For example, the base station 152 can determine the interference, which can include interference between signals from the same device and/or interference between signals from different devices. For the first estimated signal, the interference between signals from the same device can be determined based on the first estimated signal, and the interference between signals from different devices can be determined based on the second estimated signal. For the second estimated signal, the interference between signals from the same device can be determined based on the second estimated signal, and the interference between signals from different devices can be determined based on the first estimated signal.

The process 290 includes determining the signal sent from the first device by subtracting the interference from the first estimated signals (300). For example, the base station 152 can determine the signal sent from the first device by subtracting the interference between signals from the same device and/or the interference between signals from different devices from the first estimated signal.

Figure 15:
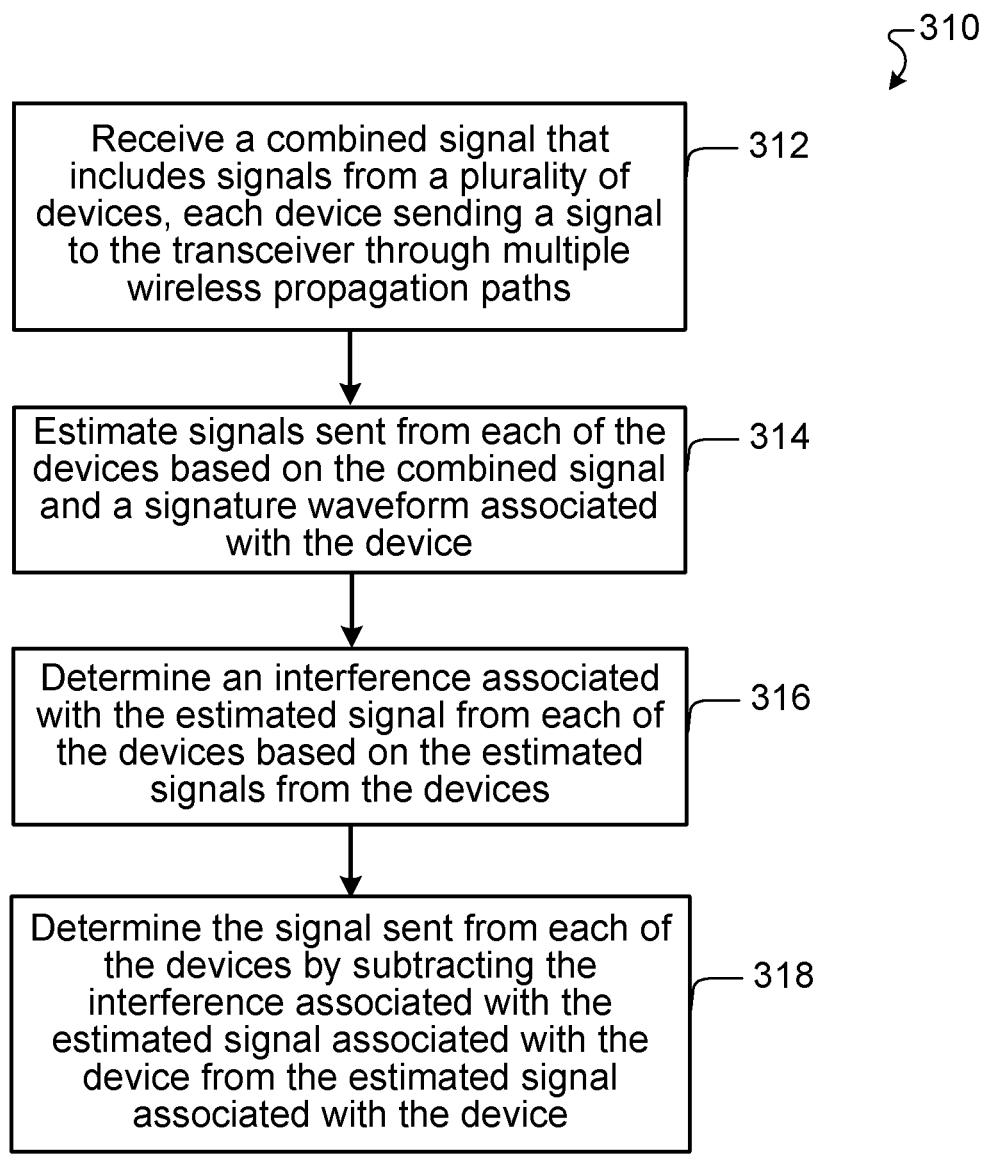

Referring to FIG. 15, a process 310 for time-reversal wireless communication with interference cancellation is provided. For example, the process 310 can be implemented by the base station 152 of FIG. 4. The process 310 includes at a transceiver, receiving a combined signal that includes signals from a plurality of devices, each device sending a signal to the transceiver through multiple wireless propagation paths (312). For example, the transceiver can be part of the base station 152, and the plurality of devices can include the first terminal device 154a and the second terminal device 154b.

The process 310 includes estimating signals sent from each of the devices based on the combined signal and a signature waveform associated with the device (314). For example, for each of the terminal devices 154, the base station 152 can apply a signature waveform associated with the terminal device 154 to a combined signal to generate estimated signals for the terminal device 154.

The process 310 includes determining an interference associated with the estimated signal from each of the devices based on the estimated signals from the devices (316). For example, the base station 152 can determine the interference, which can include interference between signals from the same device and/or interference between signals from different devices. For each terminal device 154, the interference between signals from the same device can be determined based on the estimated signal for the terminal device 154, and the interference between signals from different devices can be determined based on the estimated signals for the other devices.

The process 310 includes determining the signal sent from each of the devices by subtracting the interference associated with the estimated signal associated with the device from the estimated signal associated with the device (318). For example, for each of the terminal devices 154, the base station 152 can determine the signal sent from the device by subtracting the interference between signals from the same device and/or the interference between signals from different devices from the estimated signal for the terminal device.

A multi-user time-reversal division multiple access uplink architecture and a 2D parallel interference cancellation scheme are provided to enhance the system performance. The time-reversal division multiple access uplink architecture described above keeps the cost of the communication components of the end-users at a low level, and reuses the processing power at the base station that has already been made available for the downlink. The 2D parallel interference cancellation scheme utilizes the tentative decisions of detected symbols to effectively cancel the interference in both the time dimension (ISI) and the user dimension (IUI). To further improve the bit error rate performance, a multi-stage scheme is provided by cascading multiple stages of the 2D interference cancellation, with a total delay that increases linearly with the number of stages, but independent of the number of users. The performance results demonstrated that the 2D parallel interference cancellation scheme can significantly improve the system performance of the time-reversal division multiple access system.

In some implementations, the base station 152 can be part of a mobile or stationary device. For example, the base station 152 can be implemented as part of a sensor module, a controller, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The base station 152 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the number of users or devices, and the values for the rate back-off factor D can be different from those described above. The base station 152 and terminal devices 154 can include more components that are not shown in the figures. For example, standard components such as analog-to-digital converters, digital-to-analog converters, and power amplifiers have been omitted from the figures.

Accordingly, other embodiments are within the scope of the following claims.

What is claimed is:

1. A method comprising:
   at a transceiver of a base station,
   receiving a first probe signal from a first terminal device,
   determining a first location-specific signature waveform associated with a location of the first terminal device based on the first probe signal,
   receiving a second probe signal from a second terminal device,
   determining a second location-specific signature waveform associated with a location of the second terminal device based on the second probe signal, and
   receiving a combined uplink signal that includes a first uplink signal from the first terminal device and a second uplink signal from the second terminal device, the first uplink signal sent from the first terminal device to the transceiver of the base station through first multiple wireless propagation paths, the second uplink signal sent from the second terminal device to the transceiver of the base station through second multiple wireless propagation paths, the first uplink signal including a plurality of symbols sent from the first terminal device, the second uplink signal including a plurality of symbols sent from the second terminal device;
   generating a first set of estimated symbols based on the received combined uplink signal and the first location-specific signature waveform associated with the first terminal device, in which the first location-specific signature waveform is determined based on the first probe signal sent from the first device, the first set of estimated symbols representing a rough estimate of the symbols sent from the first device;
   generating a second set of estimated symbols based on the received combined uplink signal and the second location-specific signature waveform associated with the second device, in which the second location-specific signature waveform is determined based on the second probe signal sent from the second device, the second set of estimated symbols representing a rough estimate of the symbols sent from the second device;
   determining interference based on at least one of the first set of estimated symbols or the second set of estimated symbols; and
   generating a refined first set of estimated symbols by canceling the interference from the first set of estimated symbols, the refined first set of estimated symbols representing a refined estimate of the symbols sent from the first device.

2. The method of claim 1 in which the interference comprises inter-user interference, and determining interference comprises determining inter-user interference based on the second set of estimated symbols.

3. The method of claim 2 in which generating a refined first set of estimated symbols comprises canceling the inter-user interference due to the second device from the first set of estimated symbols.

4. The method of claim 2 in which the interference also comprises inter-symbol interference, and determining interference comprises determining inter-symbol interference based on the first set of estimated symbols.

5. The method of claim 4 in which generating a refined first set of estimated symbols comprises canceling the inter-user interference and the inter-symbol interference from the first set of estimated symbols.

6. The method of claim 1 in which the interference comprises inter-symbol interference, and determining interference comprises determining inter-symbol interference based on the first set of estimated symbols.

7. The method of claim 6 in which generating a refined first set of estimated symbols comprises canceling the inter-symbol interference from the first set of estimated symbols.

8. The method of claim 1 in which determining interference and generating a refined first set of estimated symbols are part of a first stage interference cancelation operation, and the method further comprises performing a second stage interference cancelation operation that includes:
   determining refined interference values based on the first set of estimated symbols, the second set of estimated symbols, and the symbols sent by the first device as determined by the first stage interference cancelation operation, and
   generating a further refined first set of estimated symbols by canceling the refined interference values from the first set of estimated symbols, the further refined first set of estimated symbols representing a further refined estimate of the symbols sent from the first device.

9. The method of claim 1, comprising performing a hand-shaking process between the transceiver and the first device to identify multipath channel characteristics associated with the first device, and calculating the first location-specific signature waveform for the first device based on the multipath channel characteristics associated with the first device.

10. The method of claim 1 in which generating a first set of estimated symbols comprises performing a convolution operation, or an operation equivalent to the convolution operation, between the combined signal and the first location-specific signature waveform.

11. The method of claim 1, comprising transmitting, from the transceiver to the first device and the second device, a combined downlink signal derived from a combination of a first downlink waveform and a second downlink waveform, the first downlink waveform including data intended for the first device, the second downlink waveform including data intended for the second device.

12. The method of claim 11, comprising generating the first downlink waveform based on the data intended for the first device and the location-specific signature waveform for the first device.

13. The method of claim 12 in which generating the first downlink waveform comprises performing a convolution of the data intended for the first device and the location-specific signature waveform for the first device.

14. The method of claim 11 in which the combined downlink signal is configured to enable each of the first device and the second device to receive multipath signals that can be used determine a data signal intended for the device, the first and second devices receiving the downlink signal through different propagation paths and determining different data signals.

15. The method of claim 1 in which the transceiver is part of a base station.

16. The method of claim 1 in which receiving the combined signal comprises receiving a combined signal that include signals from three or more devices communicating with the transceiver, each of the devices being associated with a corresponding location-specific signature waveform.

17. The method of claim 16 in which determining interference comprises, for each of the devices, determining inter-user interference due to each of the other devices, and the method comprises canceling the inter-user interferences due to the other devices from the estimated symbols for the each of the device.

18. The method of claim 1, comprising:
at the transceiver, receiving a second combined signal that includes a third signal from the first device and a fourth signal from the second device, and
generating a third set of estimated symbols based on the second combined signal and the first location-specific signature waveform.

19. The method of claim 1, comprising:
receiving a plurality of combined signals over time, each combined signal including signals from the first and second devices,
reusing the same first location-specific signature waveform to extract signals sent by the first device from the plurality of combined signals.

20. The method of claim 1, comprising generating the first location-specific signature waveform by time-reversing a channel response signal derived from a first probe signal sent from the first device.

21. A method comprising:
at a transceiver of a base station,
receiving a first probe signal from a first terminal device,
determining a first location-specific signature waveform associated with a location of the first terminal device based on the first probe signal,
receiving a second probe signal from a second terminal device,
determining a second location-specific signature waveform associated with a location of the second terminal device based on the second probe signal, and
receiving a combined uplink signal that includes a first uplink signal from the first terminal device and a second uplink signal from the second terminal device, the first uplink signal sent from the first terminal device to the transceiver of the base station through first multiple wireless propagation paths, the second uplink signal sent from the second terminal device to the transceiver of the base station through second multiple wireless propagation paths;
estimating the first uplink signal sent from the first terminal device to generate a first estimated uplink signal based on the received combined uplink signal and the first location- specific signature waveform associated with the first terminal device, in which the first location- specific signature waveform is determined based on the first probe signal sent from the first device;
estimating the second uplink signal sent from the second terminal device to generate a second estimated uplink signal based on the received combined uplink signal and the second location-specific signature waveform associated with the second terminal device, in which the second location-specific signature waveform is determined based on the second probe signal sent from the second device;
determining interference based on at least one of the first estimated uplink signal or the second estimated uplink signal; and
determining the signal sent from the first device by subtracting the interference from the first estimated signals.

22. The method of claim 21, comprising:
at the transceiver, receiving a second combined signal that includes a third signal from the first device and a fourth signal from the second device, and
estimating the third signal to generate a third set of estimated symbols based on the second combined signal and the first location-specific signature waveform.

23. The method of claim 21, comprising:
receiving a plurality of combined signals over time, each combined signal including signals from the first and second devices,
reusing the same first location-specific signature waveform to extract signals sent by the first device from the plurality of combined signals.

24. The method of claim 21, comprising generating the first location-specific signature waveform by time-reversing a channel response signal derived from a first probe signal sent from the first device.

25. A method comprising:
at a transceiver of a base station,
receiving a probe signal from each of a plurality of terminal devices,
for each terminal device, determining a location-specific signature waveform associated with a location of the terminal device based on the probe signal sent from the terminal device, and
receiving a combined uplink signal that includes signals from the plurality of terminal devices, each terminal device sending an uplink signal to the transceiver of the base station through multiple wireless propagation paths;
estimating uplink signals sent from each of the terminal devices based on the received combined uplink signal and a location-specific signature waveform associated with the terminal device, in which the location-specific signature waveform is determined based on the probe signal sent from the terminal device;
determining an interference associated with the estimated signal from each of the terminal devices based on the estimated uplink signals from the terminal devices; and
determining the uplink signal sent from each of the terminal devices by subtracting the interference associated with the estimated uplink signal associated with the terminal device from the estimated uplink signal associated with the terminal device.

26. The method of claim 25 in which the interference comprises inter-user interference, and determining interference associated with each of the devices comprises determining inter-user interference associated with each of the devices based on the signals sent from the other devices.

27. The method of claim 26 in which determining the signal sent from each of the devices comprises subtracting the inter-user interferences due to the other devices from the estimated signal associated with the device.

28. The method of claim 26 in which the interference also comprises inter-signal interference, and determining interference comprises determining inter-signal interference associated with each of the devices based on the estimated signal associated with the device.

29. The method of claim 28 in which determining signal sent from each of the devices comprises subtracting the inter-user interference and the inter-signal interference associated with the device from the estimated signal associated with the device.

30. The method of claim 25 in which the interference comprises inter-signal interference, and determining interference comprises determining inter-signal interference for each of the devices based on the estimated signal associated with the device.

31. The method of claim 30 in which determining the signal sent from each of the devices comprises subtracting the inter-signal interference for the device from the estimated signal for the device.

32. The method of claim 25, comprising:
at the transceiver, receiving a second combined signal that includes a plurality of signals from the plurality of devices, and
estimating the signals sent from each of the devices based on the second combined signal and the location-specific signature waveform associated with the device.

33. The method of claim 25, comprising:
receiving a plurality of combined signals over time, each combined signal including signals from the plurality of devices,
reusing the same location-specific signature waveforms to extract signals sent by the respective devices from the plurality of combined signals.

34. The method of claim 25, comprising generating each of the location-specific signature waveforms by time-reversing a corresponding channel response signal derived from a corresponding probe signal sent from a corresponding device.

35. An apparatus, comprising:
a base station having an input circuit configured to
receive a probe signal from each of a plurality of terminal devices,
for each terminal device, determine a location-specific signature waveform associated with a location of the terminal device based on the probe signal sent from the terminal device, and
receive a combined uplink signal that includes uplink signals from the plurality of terminal devices, each uplink signal being sent from a corresponding terminal device to the base station through multiple wireless propagation paths;
a time-reversal mirror module configured to estimate uplink signals sent from each of the terminal devices based on the received combined uplink signal and a location-specific signature waveform associated with the terminal device, in which the location-specific signature waveform is determined based on the probe signal sent from the terminal device; and
an interference cancellation and decision module configured to:
determine an interference associated with the estimated uplink signal from each of the terminal devices based on the estimated uplink signals from the terminal devices; and
determine the uplink signal sent from each of the terminal devices by subtracting the interference associated with the estimated uplink signal associated with the terminal device from the estimated uplink signal associated with the terminal device.

36. The apparatus of claim 35 in which the apparatus comprises a base station that comprises the input circuit, the time-reversal mirror module, and the interference cancellation module.

37. The apparatus of claim 35 in which the interference comprises inter-user interference, and the interference cancellation and decision module is configured to determine inter-user interference associated with the estimated signal from each of the devices based on the estimated signals of the other devices.

38. The apparatus of claim 37 in which the interference cancellation and decision module is configured to determine the signal sent from each of the devices by subtracting the inter-user interferences due to the other devices from the estimated signal for the device.

39. The apparatus of claim 37 in which the interference also comprises inter-symbol interference, and the interference cancellation and decision module is configured to determine inter-symbol interference for each of the devices based on the estimated signal for the device.

40. The apparatus of claim 39 in which the interference cancellation and decision module is configured to determine the signal sent from each of the devices by subtracting the inter-user interference and the inter-symbol interference from the estimated signal associated with the device.

41. The apparatus of claim 35 in which the interference comprises inter-symbol interference, and the interference cancellation and decision module is configured to determine inter-symbol interference associated with the estimated signal for each of the devices based on the estimated signal associated with the device.

42. The apparatus of claim 41 in which the interference cancellation and decision module is configured to determine the signal sent from each of the devices by subtracting the inter-symbol interference associated with the estimated signal for the device from the estimated signal for the device.

43. The apparatus of claim 35, comprising a second interference cancellation and decision module configured to determine refined interference for each of the devices based on the signal sent from each of the devices as determined by the first interference cancellation and decision module and the estimated signal associated with each of the devices as determined by the time-reversal mirror module.

44. The apparatus of claim 43 in which the second interference cancellation and decision module is configured to determine refined signals for each of the devices by subtracting the refined interference for each of the devices from the estimated signal associated with the device as determined by the time-reversal mirror module.

45. The apparatus of claim 35 in which the time-reversal mirror module is configured to calculate the location-specific signature waveform for each of the devices based on characteristics of the multiple propagation paths associated with the device.

46. The apparatus of claim 35 in which the time-reversal mirror module is configured to estimate the signal sent from each of the devices by performing a convolution operation, or an operation equivalent to the convolution operation, between the combined signal and the location-specific signature waveform for the device.

47. The apparatus of claim 35, comprising a downlink module configured to determine a combined downlink signal derived from a combination of downlink waveforms each including data intended for one of the devices.

48. The apparatus of claim 47 in which the downlink module is configured to determine each of the downlink waveforms based on the data intended for the corresponding device and the location-specific signature waveform for the corresponding device.

49. The apparatus of claim 48 in which the downlink module is configured to determine the downlink waveform for each of the devices by performing a convolution, or an operation equivalent to the convolution, of the data intended for the device and the location-specific signature waveform for the device.

50. The apparatus of claim 47 in which the combined downlink signal is configured to enable each of the devices to receive multipath signals that can be used determine a data signal intended for the device, different devices receiving the downlink signal through different propagation paths and determining different data signals.

51. The apparatus of claim 35 in which the input circuit is configured to receive a second combined signal that includes signals from the plurality of devices, and
the time-reversal mirror module is configured to estimate signals sent from each of the devices based on the second combined signal and the location-specific signature waveform associated with the device.

52. The apparatus of claim 35 in which the input circuit is configured to receive a plurality of combined signals over time, each combined signal including signals from the plurality of devices, and
the time-reversal mirror module is configured to reuse the same location-specific signature waveforms to extract signals sent by the respective devices from the plurality of combined signals.

53. The apparatus of claim 35 in which the time-reversal mirror module is configured to generate each of the location-specific signature waveforms by time- reversing a corresponding channel response signal derived from a corresponding probe signal sent from a corresponding device.

* * * * *